US009738433B2

(12) United States Patent
Hogg

(10) Patent No.: US 9,738,433 B2
(45) Date of Patent: Aug. 22, 2017

(54) APPARATUS AND METHOD FOR STORING, MANAGING, AND RAPIDLY DISPENSING ENERGY CELLS

(76) Inventor: Robert C. Hogg, Kinnelon, NJ (US)

(*) Notice: Subject to any disclaimer, the term of this patent is extended or adjusted under 35 U.S.C. 154(b) by 852 days.

(21) Appl. No.: 12/652,013

(22) Filed: Jan. 4, 2010

(65) Prior Publication Data
US 2010/0170914 A1 Jul. 8, 2010

Related U.S. Application Data

(60) Provisional application No. 61/142,294, filed on Jan. 2, 2009.

(51) Int. Cl.
B65H 1/08 (2006.01)
G07F 11/16 (2006.01)
B65D 83/02 (2006.01)
H01M 2/10 (2006.01)
H01M 10/42 (2006.01)

(52) U.S. Cl.
CPC ......... *B65D 83/02* (2013.01); *H01M 2/1016* (2013.01); *H01M 10/4207* (2013.01); *B65D 2585/88* (2013.01)

(58) Field of Classification Search
CPC . B65D 83/02; B65D 2585/88; H01M 2/1016; H01M 10/4207
USPC .................................. 221/279, 97; 224/196
See application file for complete search history.

(56) References Cited

U.S. PATENT DOCUMENTS

| | | | | |
|---|---|---|---|---|
| 900,819 A | * | 10/1908 | Aylsworth | A24F 27/20 221/139 |
| 2,779,522 A | * | 1/1957 | Puckett | F42B 39/002 221/185 |
| 2,833,028 A | * | 5/1958 | Treimann | A47F 1/06 221/232 |
| 3,373,862 A | * | 3/1968 | Minchin | B65D 83/10 206/357 |
| 4,779,759 A | * | 10/1988 | Seavey | B65D 83/00 221/154 |
| 4,850,512 A | * | 7/1989 | Vujovich | B65D 83/10 206/355 |
| 4,986,442 A | * | 1/1991 | Hinterreiter | B65D 83/0418 221/197 |
| 5,026,321 A | * | 6/1991 | Benson | G07D 9/002 206/0.84 |
| 5,071,033 A | * | 12/1991 | Siwek | B65D 83/0409 221/229 |
| 5,123,551 A | * | 6/1992 | King | A47F 5/0846 221/155 |

(Continued)

Primary Examiner — Rakesh Kumar
(74) Attorney, Agent, or Firm — Alix, Yale & Ristas, LLP

(57) ABSTRACT

An apparatus for storing and dispensing energy cells having a housing with spaced front and rear walls, side walls and a top and a bottom to form an enclosure for containing energy cells. An opening is provided in the front wall of a size to permit a single energy cell to be discharged, the opening having a top portion positioned below the top front edge of an energy cell when the cell is positioned in the upper most position ready for discharge. A platform urges the energy cells upward so the uppermost cell is in a discharge position with the top front edge of the energy cell positioned above the top portion of the opening. The rear wall, top and upper portion of the side wall are cut out to enable a user to engage the rear of the top energy cell to cause its discharge through the opening.

4 Claims, 16 Drawing Sheets

(56) References Cited

U.S. PATENT DOCUMENTS

| | | | | |
|---|---|---|---|---|
| 5,127,565 A * | 7/1992 | Grant | ................ | A41D 13/0012 |
| | | | | 2/102 |
| 5,178,298 A * | 1/1993 | Allina | ................ | B65D 83/0418 |
| | | | | 206/457 |
| 5,319,872 A * | 6/1994 | Bammate | ................ | F42B 39/00 |
| | | | | 206/3 |
| 5,366,112 A * | 11/1994 | Hinterreiter | ....... | B65D 83/0418 |
| | | | | 221/198 |
| 5,649,642 A * | 7/1997 | Mabry | ................ | B65D 83/087 |
| | | | | 221/232 |
| 6,000,589 A * | 12/1999 | Burdine | .................... | F41A 9/65 |
| | | | | 221/185 |
| 6,431,399 B2 * | 8/2002 | Gabel et al. | ................... | 221/263 |
| 6,578,732 B1 * | 6/2003 | Mabry | ............... | B65D 83/0829 |
| | | | | 221/279 |
| 7,364,057 B2 * | 4/2008 | Carroll | ...................... | A45F 5/02 |
| | | | | 221/309 |
| 7,523,841 B2 * | 4/2009 | Konig | ............................ | 221/232 |
| 7,533,483 B1 * | 5/2009 | Alzamora | ................ | F41A 9/65 |
| | | | | 42/50 |
| 7,841,488 B2 * | 11/2010 | Hagihara | ............. | B65D 83/087 |
| | | | | 221/246 |
| 8,490,828 B2 * | 7/2013 | Kaiser | ............... | B65D 83/0817 |
| | | | | 206/358 |
| 2006/0043137 A1 * | 3/2006 | Carroll | ...................... | A45F 5/02 |
| | | | | 224/625 |
| 2010/0327006 A1 * | 12/2010 | Campo | ........................ | 221/185 |

* cited by examiner

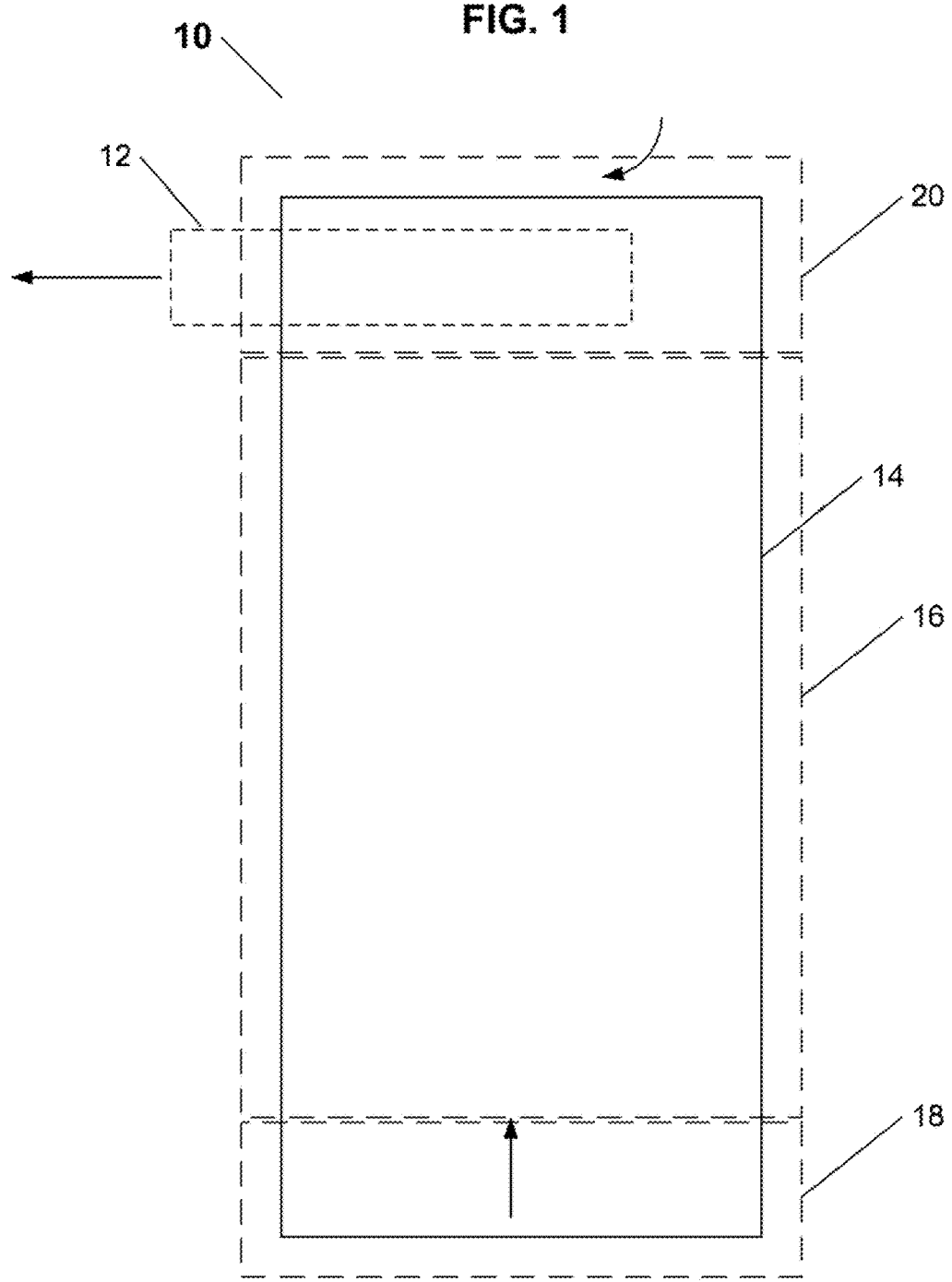

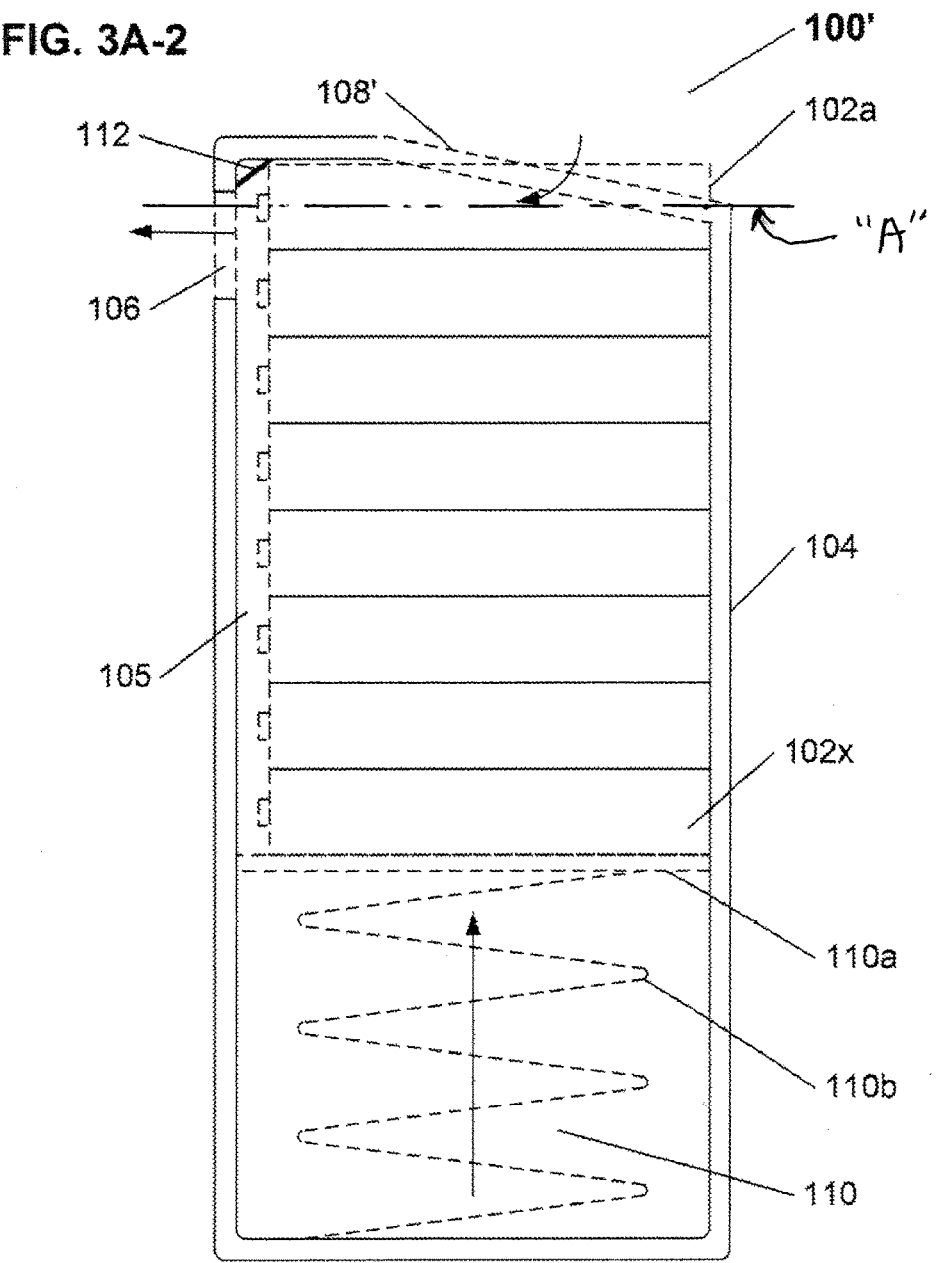
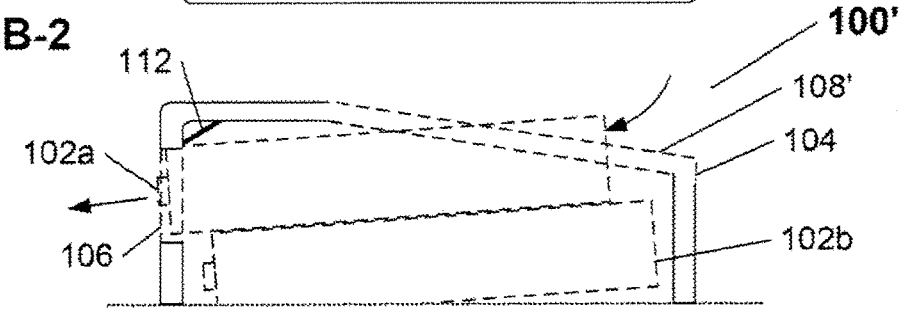

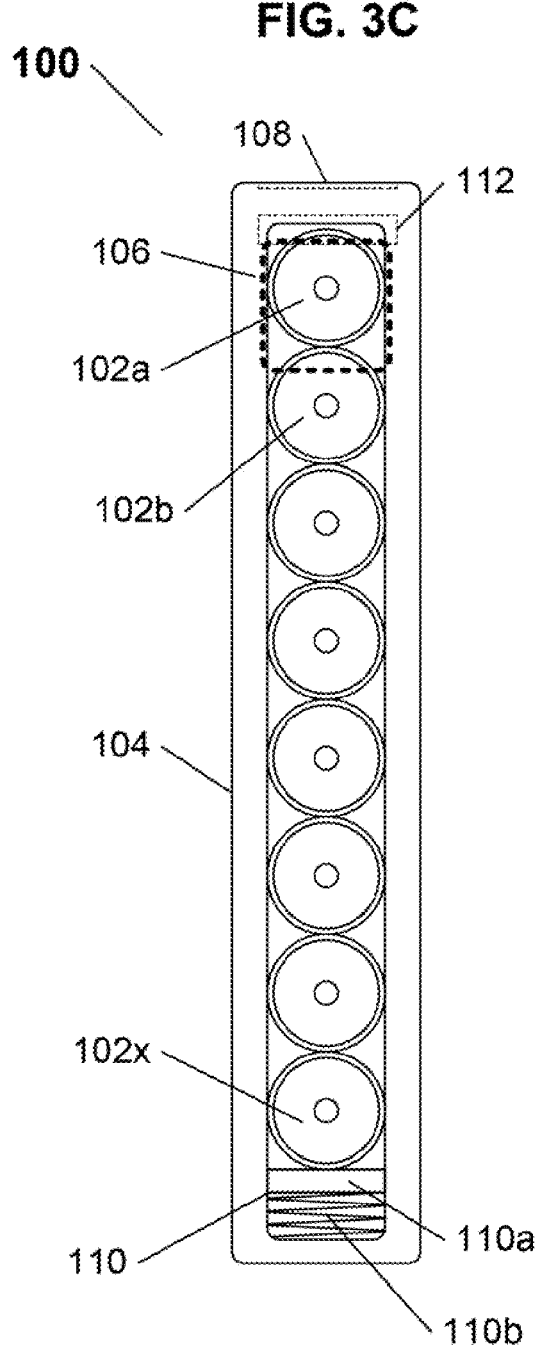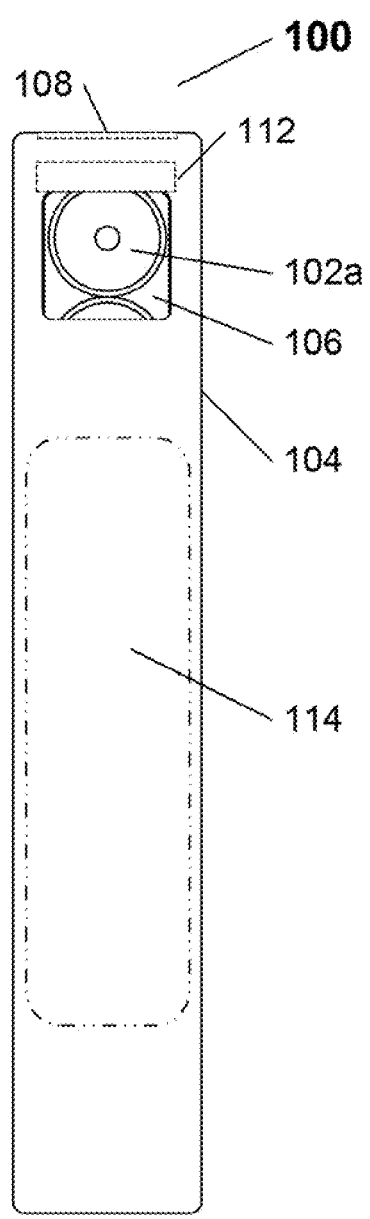

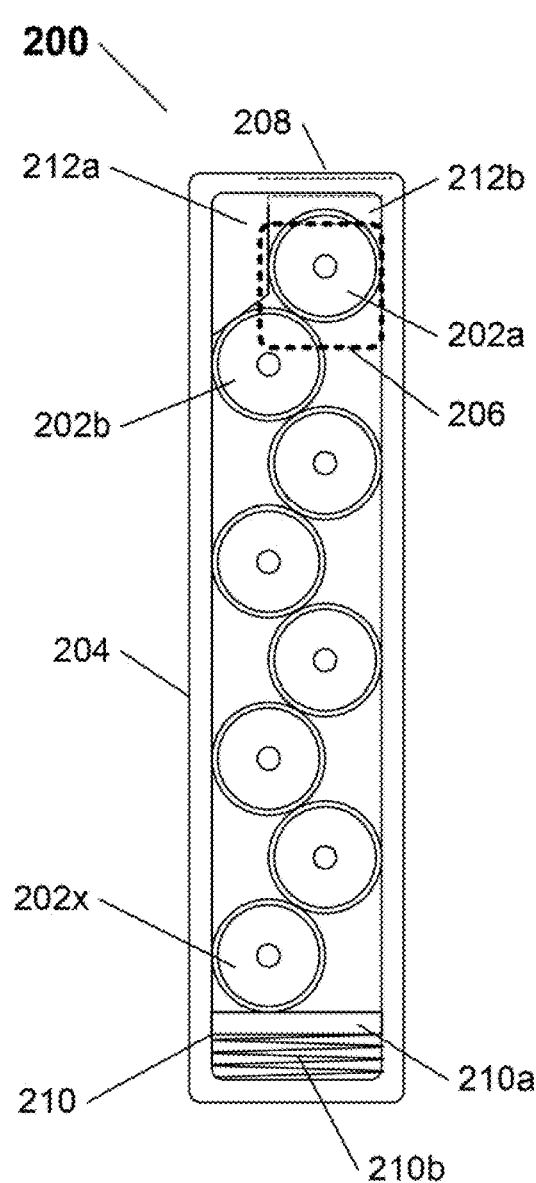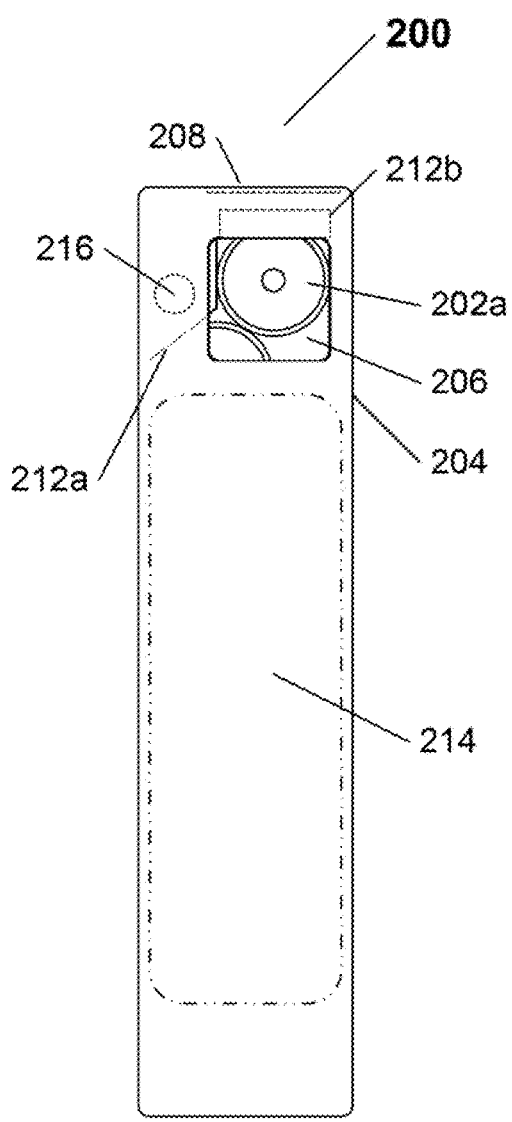

FIG. 5A
FIG. 5B
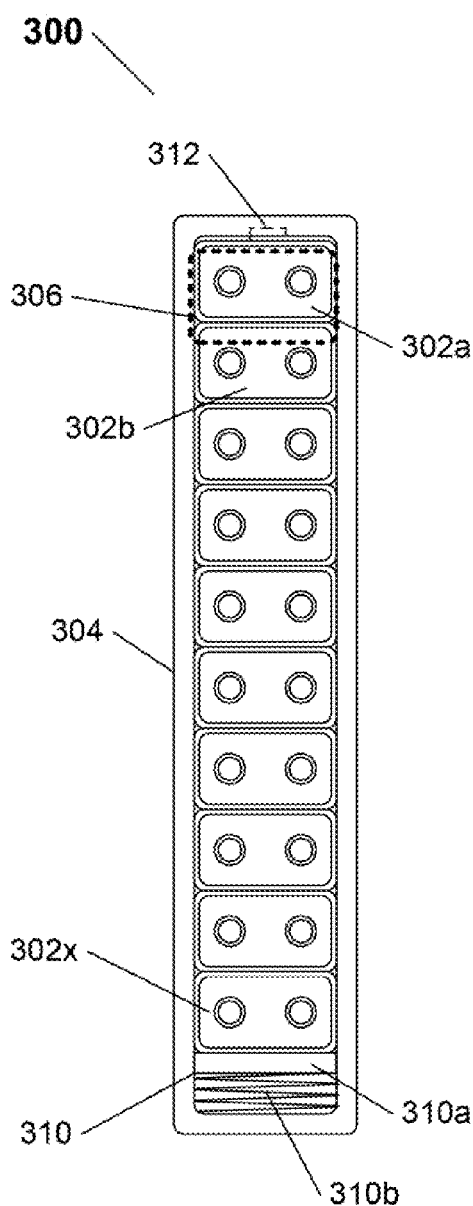
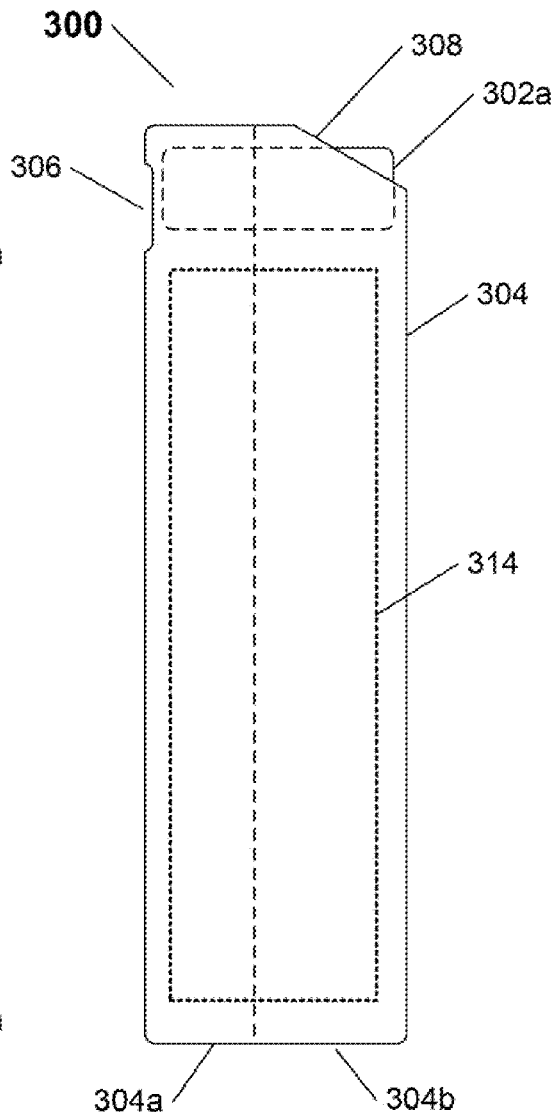

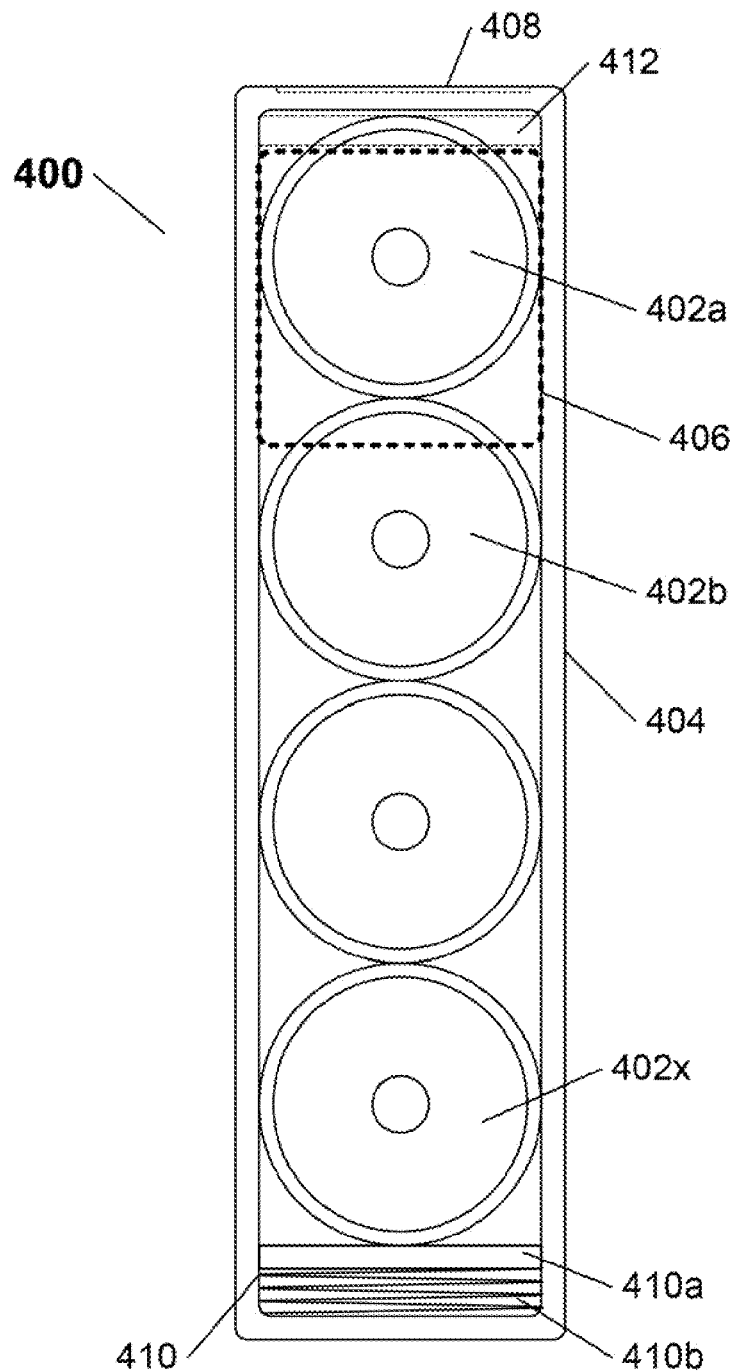

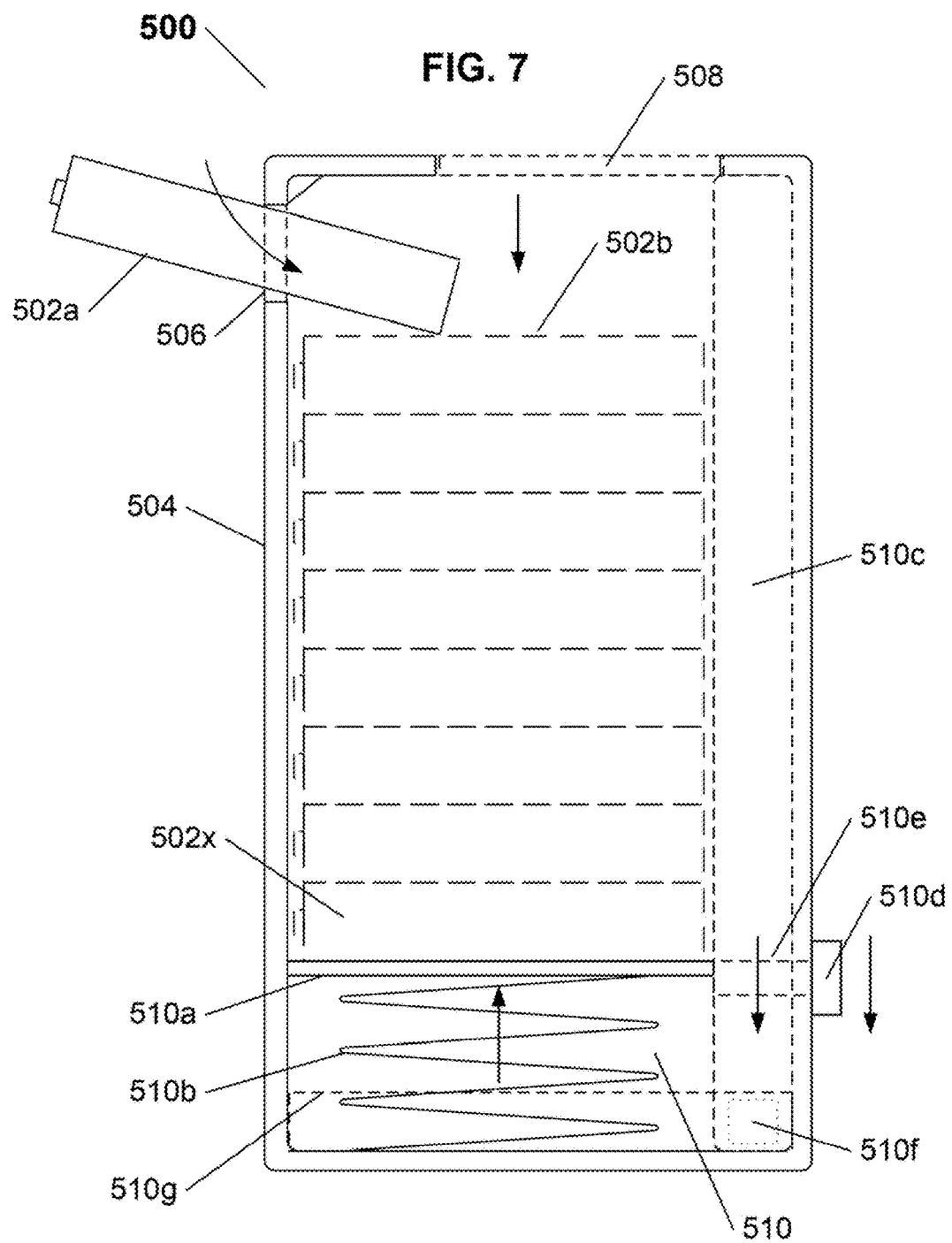

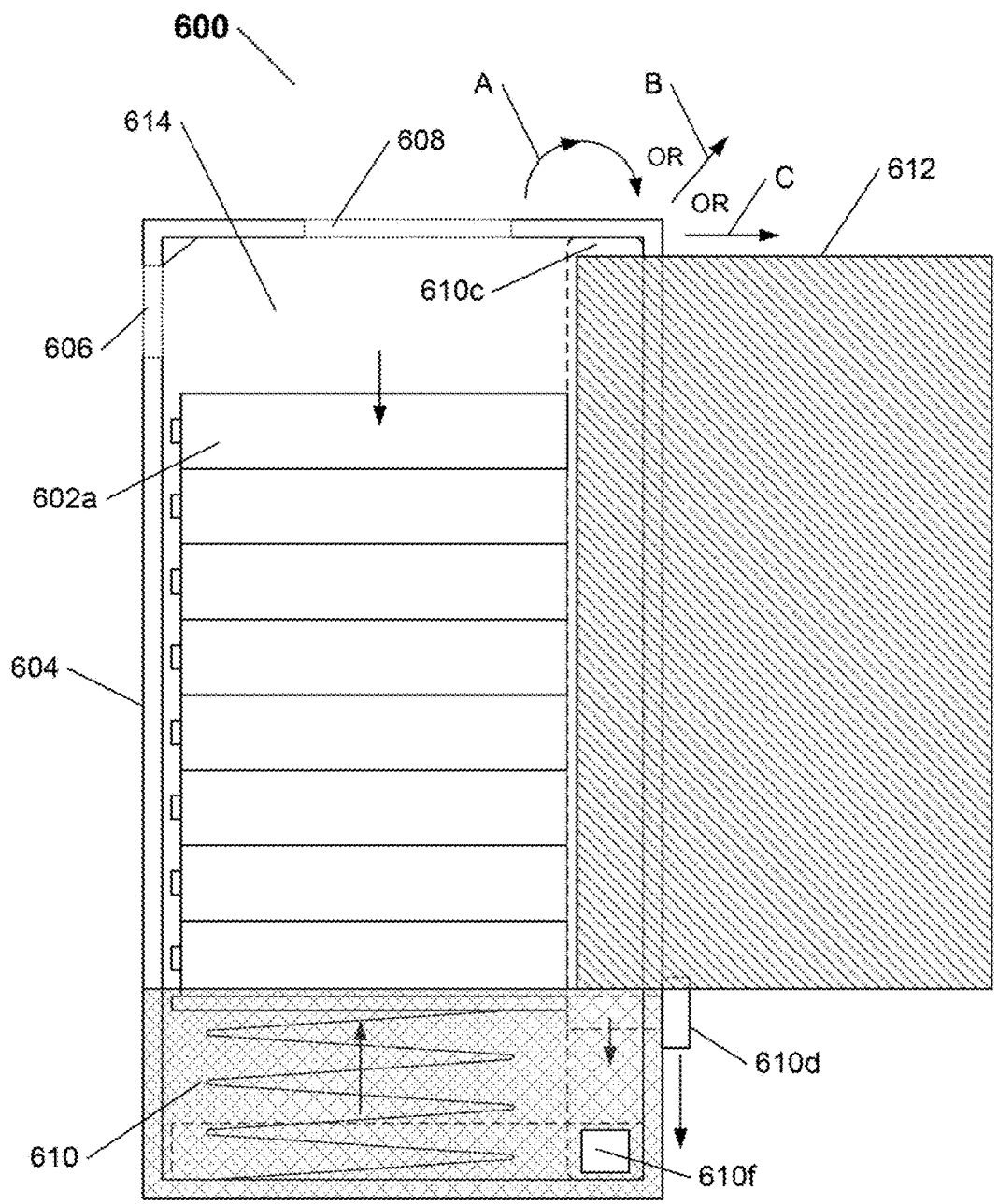

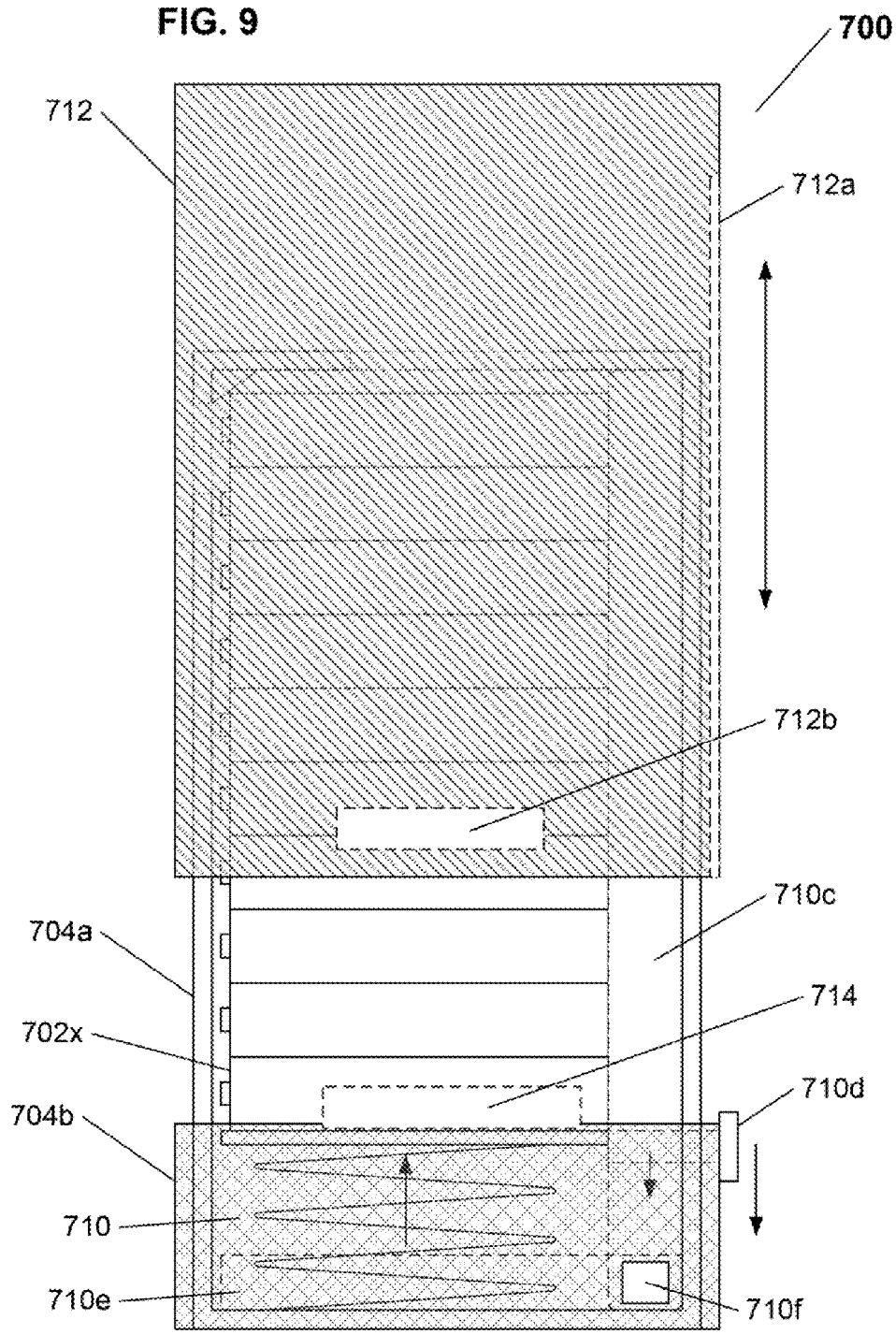

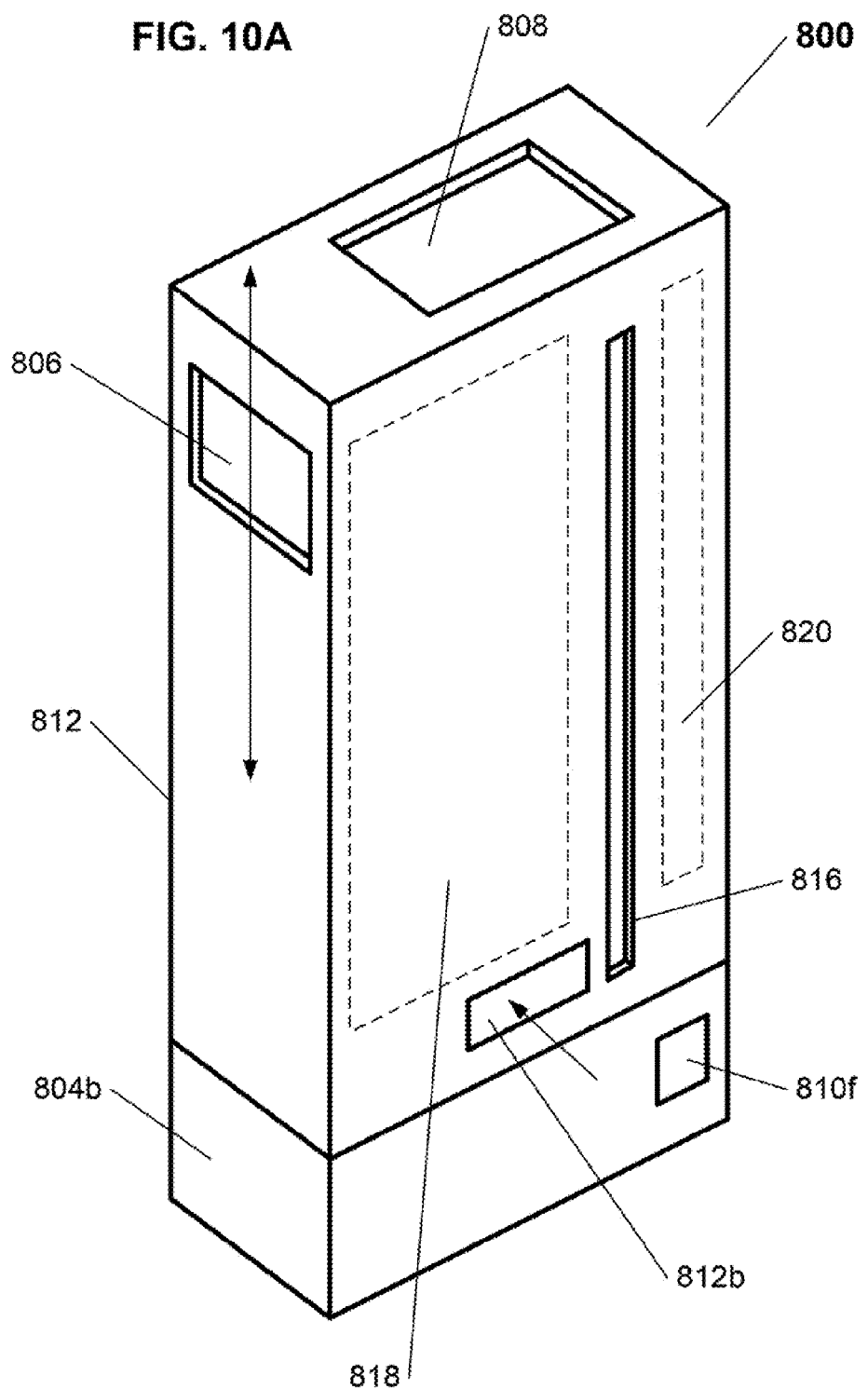

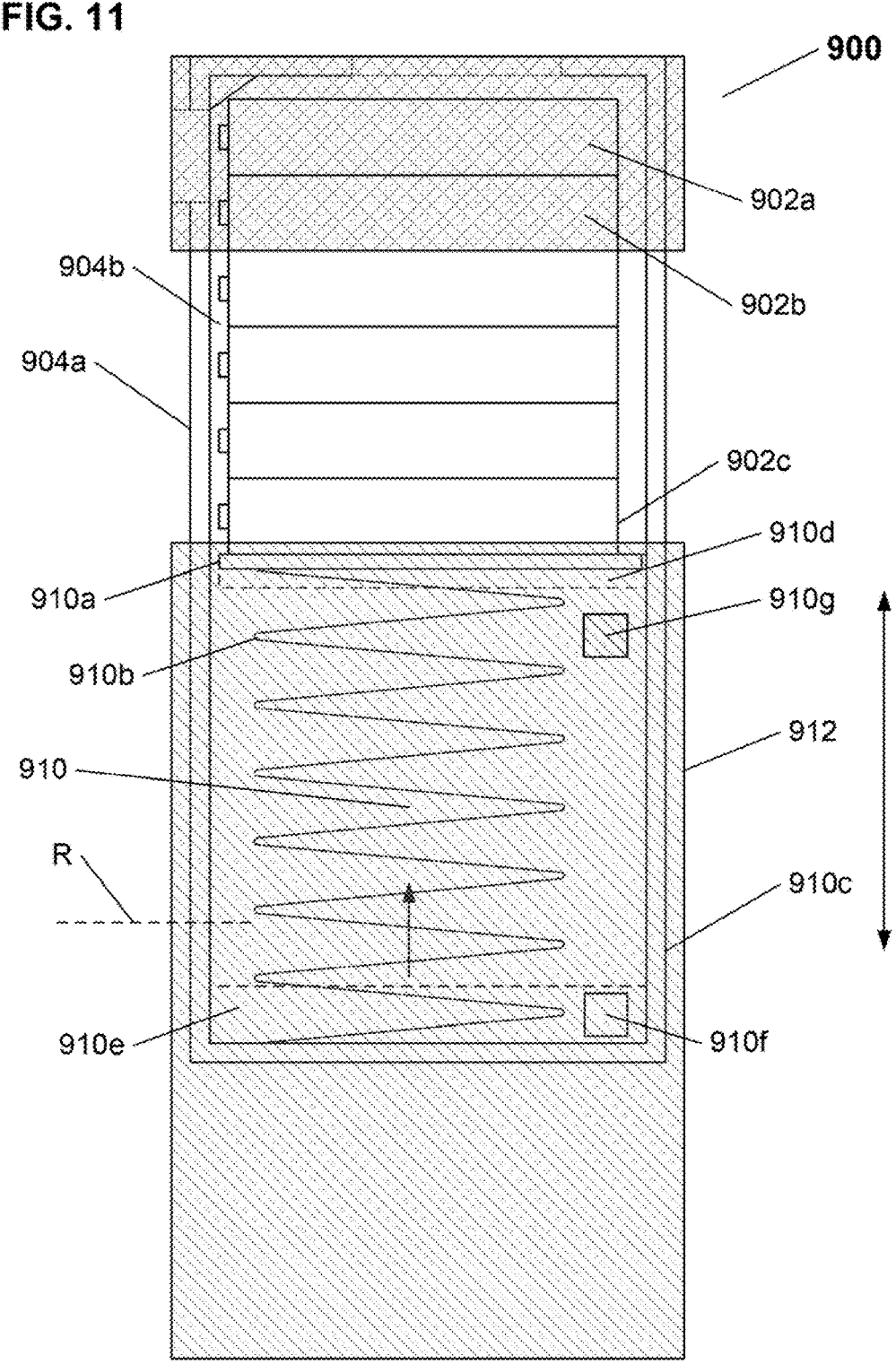

(Example)

(Example)

(Example)

(Example)

(Example)

(Example)

APPARATUS AND METHOD FOR STORING, MANAGING, AND RAPIDLY DISPENSING ENERGY CELLS

CROSS-REFERENCE TO RELATED APPLICATIONS

The present patent application claims priority from the commonly assigned co-pending U.S. Provisional Patent Application of Robert C. Hogg, entitled "APPARATUS AND METHOD FOR STORING, MANAGING, AND RAPIDLY DISPENSING ENERGY CELLS" (Ser. No. 61/142,294), filed on Jan. 2, 2009.

FIELD OF THE INVENTION

The present invention relates generally to devices and methodologies for storing multiple energy cells, and more particularly to an apparatus and method for storing, managing, and rapidly dispensing energy cells, that are optimized for convenience and ease of use.

BACKGROUND OF THE INVENTION

The vast majority of the multitude of portable and small electrical and electronic devices, components, and systems (and in some cases even larger systems), as well as virtually all toys with electrical or electronic features, rely on utilization of one or more batteries (or "energy cells") as their primary source of energy. These energy cells are typically removable and replaceable, so that when the electrical energy stored in the cells is no longer sufficient to power the device or system in question, the depleted cells can be readily removed and replaced with new ones.

While disposable energy cells (i.e., cells that are meant to be discarded when they are depleted) are used most commonly, rechargeable energy cells have also gained increased popularity in recent years. Such cells may be recharged a certain number of times after partial or complete depletion, either while remaining in the device itself (provided that the device is equipped with appropriate recharging circuitry and connected to an external power source capable of recharging the cells therein), or, more commonly, the rechargeable energy cells are removed from a device and then placed into a separate charging apparatus (connected to an external power source capable of recharging the cells therein) for a period of time sufficient to regain a desired level of capacity.

There is a wide variety of commonly available energy cells based on different battery technologies (some of which offer rechargeability as a feature), including, but not limited to Alkaline, Nickel Cadmium, Lithium, Lithium-Ion (Li-Ion), silver oxide, etc. Moreover, the vast majority of the available and most commonly used energy cells, are each associated with an industry standard classification that indicates their size, shape, terminal layout, and electrical characteristics. This classification is typically expressed as an alphanumeric code, such as a one to three letter code for the most commonly used batteries (e.g., AAA, AA, C, and D), but is also expressed in other ways, such as designations of "9-Volt", "Lantern", AAAA, A23, CR2, etc. Additionally, miniature or "button" batteries have their own classification codes that start with letters SR, LR, and AG, followed by one or more numbers. It should also be noted that in practical use, the battery classification code, which has several informational items associated therewith, is also commonly referred to as the battery "size". Therefore, for the sake of convenience, the above-described energy cell classification code will be referred to hereinafter as the "battery size". It is well known that batteries of certain sizes are in more common use in electrical and electronic products intended for different market segments. For example, AAA and AA batteries are most commonly used in consumer electrical and electronic products and components, and especially in smaller devices, such as personal media players, handheld games, and remote controls, while larger devices (such as portable radios, larger toys, etc.) utilize C and D size batteries.

On the other hand many electronic and electrical devices intended for professional use most commonly utilize 9-volt batteries. Yet other types of electrical products, such as flashlights, utilize a wide variety of battery sizes, depending on the flashlight size and its intended usage (personal, home, camping, professional, law enforcement, etc.).

Additionally, certain devices have relatively small battery drain characteristics—typically these devices are not in continuous operation during use, only drawing upon a battery charge very briefly, for example in response to a user momentarily activating the device—for example, conventional remote controls can operate for months before requiring battery replacements. However, a majority of electrical and electronic devices typically require replacement batteries after days or even mere hours of usage—either due to their extended continuous operation, or due to a high energy drain per use, or due to a combination of both. Such devices include, by way of example, mechanical toys and certain professional or industrial portable electrical and electronic equipment.

As a result of the aforementioned proliferation of electrical and electronic devices requiring various sizes of batteries (e.g., AAA, AA, C, 9-volt, etc.), coupled with relatively short lifetimes with utilization of most electrical and electronic devices, most household, offices, or other facilities must keep a significant number of spare batteries of various sizes on hand. Additionally, travelers, outdoor enthusiasts, and professionals working in the field, typically carry a number of spare batteries with them to power their electrical/electronic devices.

In vast majority of the cases, regardless of their size, batteries are sold in "blister packs"—thin plastic tray-like containers backed with cardboard, which are inconvenient to store and carry (especially when the packs contain many batteries), and which are essentially useless for storage once opened (e.g., by removing or tearing the cardboard package backing), due to the loss of integrity of the packaging, and due to the difficulty of identifying the stored batteries from the back of a partially torn pack. Of course, carrying an opened blister back poses additional problems, as batteries will certainly fall out and become mixed with other transported items, or lost.

Moreover, because many individuals do not always discard depleted batteries (especially if they have been only partially depleted, and/or in view of environmental disposal considerations, etc.), and thus store them along with the fresh ones, carelessly stored depleted batteries may intermix with new ones. Also, when batteries are stored or carried with their terminals exposed, there is the possibility that the terminals would be crossed either by conductive objects (e.g., keys, change, etc.), or even by one another, which would result in rapid discharge, heating up, and even leakage of the affected batteries, if left in such contact over a period of time.

An additional challenge exists in storing batteries of multiple sizes in one place, as is typically done—certain battery sizes appear quite similar (e.g., AAA and AA), such that the users may take incorrect size batteries with them.

Furthermore, when a number of incomplete battery, packs are stored, especially in large quantities, the total on-hand amount of fresh batteries of each size—may be difficult to quickly ascertain.

Additionally, there are quite a few situations in which multiple batteries of specific sizes must be located and dispensed quickly and efficiently, and/or on-hand quantities assessed, often without the benefit of sufficient available light, for example in field situations where the needed batteries must be carried (e.g., during travel, during professional activities (e.g., filming or photographing in the field, or in military, law enforcement, scientific, or medical field operations, etc.), or in other situations during which needed batteries of predefined sizes must be immediately available for dispensing, (e.g., during sound-stage, on-location or studio filming or recording (e.g., audio, video, or A/V recording) sessions, professional photography sessions, etc.). Yet another challenge arises in situations where the person who needs to quickly locate a specific quantity of specific size batteries and prepare them for use only has one hand available, for example if the person is holding a piece of equipment, or if the person's hand is otherwise occupied (such as during climbing, etc.). The above needs are almost impossible to meet when the batteries are carried loose, in makeshift containers, or even in their original packaging (especially once that packaging has been opened).

The above-described challenges of previously known typical approaches to storing, transporting, and "managing" the necessary multitude of energy cells of various sizes in household, professional, and/or industrial settings, and during travel and/or field use, are not exhaustive by any means, and are just representative of the more prevalent problems confronting those who use, and/or who must replace, energy cells frequently and/or in large quantities. To address at least a portion of the above these challenges, a number of solutions for storing and/or dispensing energy cells have been proposed over the years, that may be broadly classified into two broad categories—(1) facility-based solutions for storing and/or dispensing large quantities of energy cells in one location, such as wall-mounted systems (some with gravity-based dispensers), or large storage containers (or furniture drawer inserts), for example having separate sections for batteries of different sizes (in certain cases, the sections being shaped and configured to retain and substantially immobilize batteries of specified sizes therein); and (2) portable/field solutions, most often implemented as simple small lidded plastic containers (e.g., boxes) sized for certain battery sizes (or for more than one size), some of which may include region(s) shaped and configured to store and retain batteries of a specific battery size, either formed into the container itself, and/or into one or more trays (optionally removable from the container), or alternately implemented as elongated cardboard boxes, typically with a tear-away portion exposing an open region large enough to enable a small number of batteries to be removed therefrom at any one time (e.g., by positioning the open region over a person's hand and shaking out a desired number of batteries).

Unfortunately, as can be readily ascertained, most of the aforementioned previously known solutions only address a very small portion of the above-described challenges. While they at least in part solve the problem of mixing multiple battery sizes during storage, and alleviate the need to store or transport batteries in open blister packs, the vast majority of challenges remained unanswered. In particular, none of the aforementioned solutions address the need for quickly identifying battery sizes, quantity on-hand, and/or quickly and easily dispensing multiple batteries of a specific desired size, esp. in lowlight conditions, or where the dispensing individual only has one of their hands available for managing the dispensing of batteries.

However, one recent solution attempted to address a larger portion of the challenges associated with storage, management, and dispensing of batteries, than previously known approaches. This solution has been disclosed in the U.S. Pat. No. 7,287,648, entitled "Battery Holder and Dispenser", issued Oct. 30, 2007, to Richard Foreman et al (hereinafter, the "'648 Patent"). The '648 Patent discloses various embodiments of a device for holding and dispensing batteries that comprises an elongated "skeletal" structure with multiple individual compartments each configured for releasably storing a single battery of a predefined size in a manner which exposes a portion of the battery to the user's feel, with each compartment including a releasable retaining element for retaining a battery inserted therein until the element is manually, and individually released by the user separately, or through manipulation of the stored battery to overcome the element's retaining strength.

While the solutions proposed by the '648 patent appear to solve a portion of the above-described challenges (e.g., the problems associated with sorting, storing, and carrying batteries), they only partially address several other challenges, fail to address certain challenges at all, and actually cause additional problems under certain circumstances. Or example, while the '648 patent purports that the holder/dispenser disclosed therein makes batteries easy to dispense therefrom, while holding the device in one hand, that only holds true if one or two batteries are being dispensed—because the batteries are stored in individual compartments along the entire length of the device, the user must change their grip after ejecting only one or two batteries before having to reposition the device to access additional individual battery chambers (increasing the likelihood of the device being dropped). Additionally, while it may be relatively easy for most users of the device of the '648 patent to force one or two batteries out of their individual holding areas past their respective retaining components, for dispensing of multiple batteries, the required repositioning of the device in the user's hand after each battery ejection will quickly become uncomfortable, or even painful or unworkable for weaker individuals, individuals suffering from fatigue, or those with medical problems (such as arthritis, carpal tunnel syndrome, etc.)—at the very least leading to frustration, and/or to inability to continue to operate the device, or quite likely to the device being dropped (an even more likely scenario if the dispenser is wet, and/or if the user's hands are sweaty or otherwise moist. Because the device of the '648 patent must balance the ease of releasability of each stored cell with the force retaining it in its compartment during use, it is quite likely that if the device is dropped (as may easily happen after continuously using it to dispense multiple cells), at least a portion of the cells are very likely to be undesirably ejected therefrom, and/or to be damaged (due to the fact that all of the stored cells are largely exposed by the structure).

Therefore, device of the '648 patent has at least the following serious drawbacks:

(1) because each battery is stored in its own compartment, dispensing more than one or two batteries at a time can quickly become uncomfortable and/or tiring, requiring continuous repositioning of the device and increasing the likelihood of it being dropped (possibly losing and/or damaging the stored batteries) commensurately with the number of batteries being dispensed;

(2) unless the batteries are held very securely in their compartments (thus exacerbating the problem (1), above), dropping of the device is likely to lead to damage to, and/or to loss of, stored batteries;

(3) just as it is difficult and frustrating to dispense a large number of batteries one at a time, the device is similarly frustrating and difficult to load with new batteries, requiring each loaded battery to be forced past its retaining element in each individual compartment;

(4) the stored batteries are exposed to the elements and to their environment when transported, and are exposed to being damaged or ejected if the device is jostled or dropped;

(5) the skeletal structure of the device offers many protrusions that may snag on a variety of objects interfering with its quick use;

(6) it may difficult to quickly distinguish between batteries of similar sizes (such as AAA and AA) since the user must rely only on seeing the exposed portions of the batteries;

(7) it is difficult to quickly ascertain the quantity on hand of larger capacity devices;

(8) the exposed skeletal nature of the device removes the possibility of adding valuable features thereto, such as battery capacity testing, dispensing assisting light, etc.; and (9) the exposed skeletal nature and the required structural integrity of the device of the '648 patent makes it unsuitable for retail packaging and/or for disposable device applications.

It would thus be desirable to provide an apparatus for storing, managing, and rapidly and easily dispensing multiple energy cells, that is optimized for convenience and ease of use. It would also be desirable to provide an apparatus for storing, managing, and dispensing energy cells that securely stores the cells therein and substantially protects them from impact likely to occur during ordinary use thereof. It would further be desirable to provide an apparatus for storing, managing, and dispensing energy cells that facilitates quick and convenient removal of one or more of the cells from the housing by a user, preferably utilizing only a single hand. It would additionally be desirable to provide an apparatus for storing, managing, and dispensing energy cells that enables quick and easy identification of the size of the cells stored therein, and/or to quickly ascertain the remaining quantity stored. It would moreover be desirable to provide an apparatus for storing, managing, and dispensing energy cells that enables quick and easy loading of one or more replacement cells therein. It would furthermore be desirable to provide an apparatus for storing, managing, and dispensing energy cells that comprises one or more additional features, such as low-light cell quantity and/or size assessment, a dispensing assistance light, other electronic features (e.g., recharging, flashlight, radio, USB recharger, etc.), decorative, promotional, and/or advertising elements on the outer casing, manually activated or automatic rapid indication of each cell's remaining capacity prior to its ejection by a user, manually activated or automatic indication of each stored cell's remaining capacity, and/or pocket and/or belt attachment positioned on the housing. It would additionally be desirable to provide an apparatus for storing, managing, and rapidly and easily dispensing multiple energy cells, that is optimized for convenience and ease of use, and that is capable of being fabricated as an inexpensive disposable product, that is preferably suitable for retail packaging.

BRIEF DESCRIPTION OF THE DRAWINGS

In the drawings, wherein like reference characters denote corresponding or similar elements throughout the various figures:

FIG. 1 is an exemplary schematic diagram illustrating a first exemplary embodiment of the inventive apparatus for storing, managing, and rapidly dispensing energy cells;

FIG. 3A-1 is an exemplary cut-away side-view diagram illustrating a second exemplary embodiment of the inventive apparatus for storing, managing, and rapidly dispensing energy cells, shown by way of example during utilization thereof to store energy cells;

FIG. 3B-1 is an exemplary cut-away side-view diagram illustrating a top portion of the inventive apparatus of FIG. 3A-1, shown by way of example during utilization thereof to dispense an energy cell therefrom;

FIG. 3A-2 is an exemplary cut-away side-view diagram illustrating a first alternate embodiment of the second exemplary embodiment of the inventive apparatus of FIG. 3A-1;

FIG. 3B-2 is an exemplary cut-away side-view diagram illustrating a top portion of the inventive apparatus of FIG. 3A-2, shown by way of example during utilization thereof to dispense an energy cell therefrom;

FIG. 3C is an exemplary cut-away front-view diagram illustrating the inventive apparatus of FIG. 3A-1, shown by way of example during utilization thereof to store energy cells;

FIG. 3D is an exemplary front-view diagram illustrating the inventive apparatus of FIG. 3A-1, shown by way of example during utilization thereof to store energy cells;

FIG. 4A is an exemplary cut-away front-view diagram illustrating a second alternate embodiment of the inventive apparatus of FIG. 3A-1, shown by way of example during utilization thereof to store energy cells;

FIG. 4B is an exemplary front-view diagram illustrating the embodiment of the inventive apparatus of FIG. 4A, shown by way of example during utilization thereof to store energy cells;

FIG. 5A is an exemplary cut-away front-view diagram illustrating a first alternate embodiment of the inventive apparatus of FIG. 3A-2, shown by way of example during utilization thereof to store energy cells;

FIG. 5B is an exemplary side-view diagram illustrating the embodiment of the inventive apparatus of FIG. 5A, shown by way of example during utilization thereof to store energy cells;

FIG. 6 is an exemplary cut-away front-view diagram illustrating a second alternate embodiment of the inventive apparatus of FIG. 3A-2, shown by way of example during utilization thereof to store energy cells;

FIG. 7 is an exemplary cut-away side-view diagram illustrating a third exemplary embodiment of the inventive apparatus for storing, managing, and rapidly dispensing energy cells, comprising a cell loading assistance feature, shown by way of example during utilization thereof to load energy cells for storage therein;

FIG. 8 is an exemplary partial cut-away side-view diagram illustrating a fourth exemplary embodiment of the inventive apparatus for storing, managing, and rapidly dispensing energy cells, comprising multiple cell loading assistance features, shown by way of example during utilization thereof to load energy cells for storage therein;

FIG. 9 is an exemplary partial cut-away side-view diagram illustrating a fifth exemplary embodiment of the inventive apparatus for storing, managing, and rapidly dispensing energy cells, comprising multiple cell loading assistance features, shown by way of example during utilization thereof to load energy cells for storage therein;

FIGS. 10A and 10B are exemplary perspective view diagrams illustrating an exemplary alternate embodiment of the inventive apparatus of FIG. 9, shown by way of example during utilization thereof to store energy cells therein;

FIG. 11 is an exemplary partial cut-away side-view diagram illustrating a sixth exemplary embodiment of the inventive apparatus for storing, managing, and rapidly dispensing energy cells, comprising multiple cell loading assistance features, shown by way of example during utilization thereof to load energy cells for storage therein;

SUMMARY OF THE INVENTION

Figure 2:
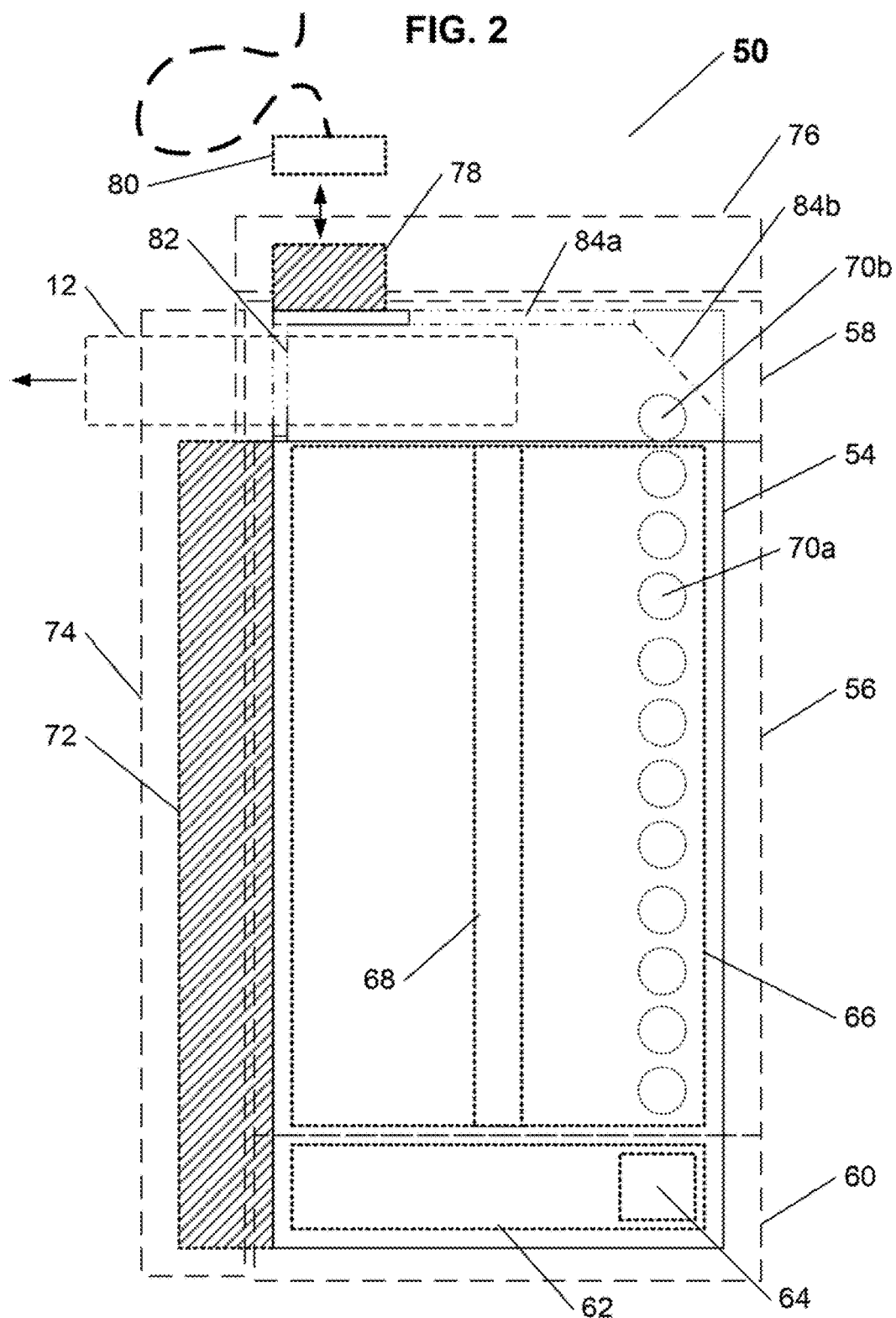
FIG. 2 is an exemplary schematic diagram illustrating an exemplary alternate embodiment of the inventive apparatus of FIG. 1.

The various embodiments of the apparatus and method of the present invention advantageously address and resolve all of the disadvantages of the previously known and proposed solutions for storing, transporting, and/or managing of energy cells and similar elements. Specifically, the inventive apparatus is optimized for convenience and ease of use in storing, managing, and rapidly and easily dispensing multiple energy cells, and that, in various exemplary embodiments thereof, provides at least the following advantageous features:

(1) enables secure storage of the cells therein while providing substantial protection them from impact thereto likely to occur during ordinary use thereof;
(2) enables quick and convenient removal of one or more of the cells from the housing by a user, preferably utilizing only a single hand;
(3) enables quick and easy loading of one or more replacement cells therein;
(4) enables quick and easy identification of the size of the cells stored therein, and/or allows a user to quickly ascertain the remaining quantity of cells stored; and
(5) that may be manufactured using a wide variety of inexpensive fabrication techniques.

In various embodiments thereof, the novel apparatus for storing, managing and rapidly dispensing one or more energy cells, comprises a generally elongated housing with an internal chamber for storing the cells in one or more substantially parallel stacked positions, a dispensing section configured to enable and facilitate quick and convenient removal of one or more of the cells from the housing by a user (preferably utilizing only a single hand), and also includes a retention/feeding mechanism for (1) retaining the cells in the internal chamber during storage, and, after each cell is removed through the dispensing section, for (2) automatically advancing the remaining cells, and readying the next cell for rapid and easy retrieval.

The inventive apparatus securely stores the cells therein, and substantially protects them from impact likely to occur during ordinary use thereof, and, in various embodiments thereof, enables quick and easy identification of the size, and/or assessment of the remaining quantity, of the cells stored therein, enables quick and easy loading of one or more replacement cells therein, and comprises one or more additional features: for example facilitating low-light operation, other electronic features (e.g., recharging, flashlight, radio, USB recharger, etc.), decorative, promotional, and/or advertising elements on the outer casing, indication of the remaining capacity of one or more stored cells. In at least one embodiment thereof, the inventive apparatus is configured for fabrication and use as an inexpensive (and optionally disposable) product for storing, managing and rapidly dispensing one or more energy cells, that is preferably suitable for retail packaging.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The inventive apparatus for storing, managing and rapidly dispensing stored energy cells therefrom, remedies the flaws and drawbacks of all previously known solutions relating to energy cell storage, management and dispensing, by providing various advantageous embodiments of novel apparatus solutions for storing, managing, and rapidly and easily dispensing multiple energy cells (preferably though one-handed action by the user while retaining the same full grip on the apparatus), that are optimized for convenience and ease of use, that enable secure and substantially protected storage of energy cells, that facilitate quick and easy identification of the size, and/or of the remaining quantity of the cells stored therein, and that allow quick and easy loading of one or more replacement cells therein.

In additional/alternate embodiments thereof, the inventive apparatus may also advantageously comprise one or more additional desirable features, including, but not being limited to: a gripping component to facilitate the user's grip on the apparatus during use, low-light energy cell quantity and/or size assessment, a dispensing assistance light, other electronic features (e.g., recharging, flashlight, radio, USB recharger, etc.), solutions for readily positioning and/or presenting decorative, promotional, and/or advertising elements on the outer casing, advantageous techniques for mass production thereof while retaining low-cost customization capabilities, manually or automatically activated rapid indication of each energy cell's remaining capacity, prior to its ejection by a user, manually or automatically activated indication of each stored cell's remaining capacity, and/or pocket and/or belt attachment positioned on the apparatus housing.

In yet additional alternate embodiments thereof, the inventive apparatus comprises at least a portion of the various above-described advantageous inventive features, but at the same time is configured to enable fabrication thereof as an inexpensive disposable product, that is also preferably suitable for retail packaging.

In brief summary, in at least the majority of various embodiments thereof, the novel apparatus for storing, managing and rapidly dispensing energy cells, comprises a generally elongated housing with an internal chamber for storing the cells in one or more substantially parallel stacked positions, a dispensing section configured to enable and facilitate quick and convenient removal of one or more of the cells from the housing by a user (preferably by utilizing only a single hand), and that also includes a retention/feeding mechanism for retaining the cells in the internal chamber during storage, and, after each cell is removed through the dispensing section, for automatically advancing the remaining cells, and readying the next cell for rapid and easy dispensing from the dispensing section by the user. Various exemplary embodiments of the apparatus of the present invention are shown in FIGS. 1 to 11, and described in greater detail below in connection therewith.

It should be noted that the various exemplary embodiments of the inventive apparatus, shown in FIGS. 1 to 11 are shown and described with reference to use in conjunction with energy cells of the illustrated sizes and shapes by way of example only, and are not intended to be limited to utilization solely with energy cells of those specific configurations—the inventive apparatus may be readily sized and configured for use with various energy cells of different sizes and shapes as a matter of design choice, convenience, or necessity, without departing from the spirit of the present invention.

It should be also noted that in the various drawing FIGS. 1-11, and in accompanying descriptions herein, various inventive apparatus shapes, sizes, as well as the shapes, sizes and designs of various inventive apparatus elements, components and features, that may be provided in accordance with the present invention, are shown by way of example only, and, subjects to specific descriptions herein, shall not serve as a limitation on the type, size or configuration of shapes, elements, components and features that are protected or protectable by the patent claims presented herewith.

Furthermore, it is readily contemplated that various embodiments of the inventive apparatus of FIGS. 1-11, may be produced from virtually any material, or combination of materials, suitable for use in small portable devices and capable of supporting the minimum necessary structural integrity during storage of cells of appropriate quantity and size therein, and during dispensing and loading of cells of appropriate quantity and size, especially in response to action and forces exerted by the feeding/retaining component of the apparatus during cell dispensing/loading activities. Such materials, capable of being utilized in production of the inventive apparatus may include, but are not limited to, one or more of the following: plastic (and other materials from the plastic family), polymers, metal, wood, resilient materials (vulcanized rubber, etc.), and/or other equivalent natural or synthetic materials, that may be selected as a matter of design choice, convenience, or necessity, without departing from the spirit of the present invention. Advantageously, the above-described materials, or combinations thereof, may be utilized in a wide variety of textures, thicknesses, colors, transparencies, and/or other properties or configurations, as a matter of design choice, convenience, or necessity, without departing from the spirit of the present invention.

In an alternate embodiment of the present invention, various embodiments of the inventive apparatus of FIGS. 1-11 may be fabricated to be disposable in whole or in part (i.e. having only some components that are disposable). The materials for use in such inventive embodiments are preferably inexpensive, but still capable of providing the necessary levels of structural integrity and external/internal impact/shock resistance, for at least the expected lifetime of the disposable inventive apparatus embodiments (which would certainly be much shorter than those of inventive apparatus embodiments intended for long-term use. These materials may include, but are not limited to, one or more of the following: cardboard, cardstock, thin plastic, plasticard, thin wood, fiberboard, pressed board, etc., that may optionally be reinforced by one or more of the following techniques: corrugation, layering, lamination, and/or impregnation with one or more fortifying substances. An additional advantage of the use of such materials, is that all or a large portion of the inventive disposable apparatus housing may be fabricated as stamped or printed flat sheets that are later folded and configured into the apparatus housing and various components thereof, through locking tab/slot techniques, by use of adhesive or other bonding, or via a combination thereof. Such disposable inventive apparatus configurations may be useful to greatly lower fabrication complexity and cost of the inventive apparatus to enable its use as disposable retail packaging for energy cells (that would be disposed after all of the cells stored therein have been dispensed). For such disposable embodiments of the inventive apparatus, the various openings in the apparatus for dispensing and guiding cells (see FIG. 2 and accompanying description below), may be sealed initially by removable "tear-away" temporary closure elements, that could later be removed by the user after purchase, to expose the necessary cell dispensing opening/guidance regions. Furthermore, advertising and/or other forms of promotional elements are quite easy and inexpensive to print on one or more surfaces of the future disposable inventive apparatus housing, during fabrication thereof.

Figures 1, 3A:
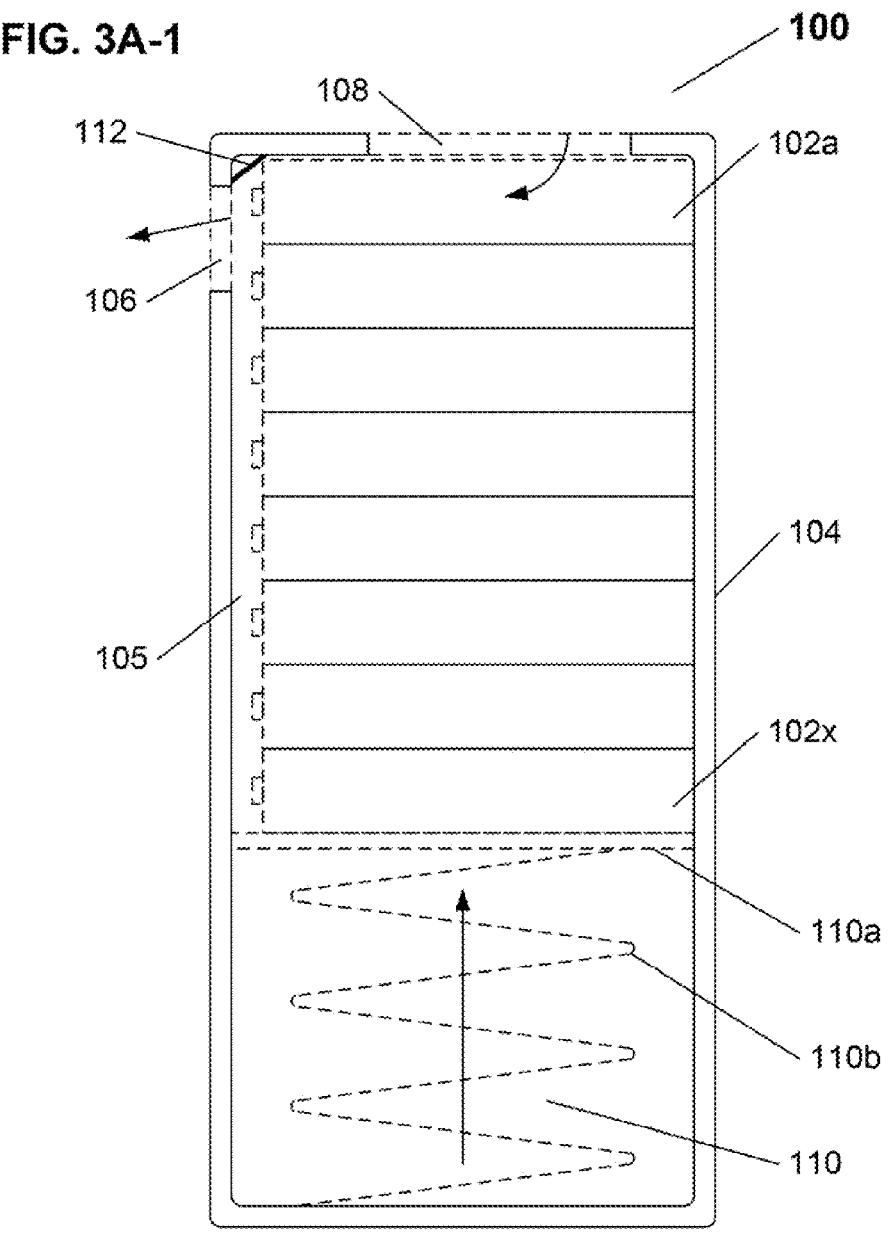

Referring now to FIG. 1, an exemplary schematic diagram is shown, illustrating a first exemplary broadest embodiment of the inventive apparatus 10 for storing, managing, and rapidly dispensing energy cells 12 (at least one of which is shown, by way of example, as being dispensed). The novel apparatus 10 comprises a generally elongated housing 14, having an internal structure (not shown) within an elongated central storage section 16, for storing the cells 12 in one or more substantially parallel stacked configurations (such as shown in various views in FIG. 3A-1, 3C, or 4A,), with the cells 12 being oriented to be longitudinally perpendicular to an axis along the longest elongated portion of the housing 14, a cell dispensing section 20, positioned above the housing portion 16, that is configured to enable and facilitate quick and convenient removal of one or more of the cells 12, from the storage section 16 of the housing 14, by a user (preferably utilizing only a single hand), additionally assisting in the retention of the cells 12 in the housing 14, when not being dispensed by the user, and also comprises a cell retention/feeding section 18, comprising a corresponding retention/feeding component therein (such as shown in FIGS. 3A-1, 3C, 4A, 5A, 6-9, and 11), that is capable of operating within the storage section 16, up to a position proximal to the dispensing section 20, and being operable to (1) retain the cells 12 in the internal chamber of the storage section 16 during storage thereof, and, (2) after each cell 12 is removed through the dispensing section 20, operable, in conjunction with a cell 12 retaining component of the dispensing section 20 (not shown), to automatically advance the remaining cells 12 toward the dispensing section 20, readying the next cell 12 for rapid and easy dispensing therefrom, but only in response to a dispensing action by the user (described in greater detail below, at least in connection with FIG. 2)—absent a dispensing action by the user, the readied cell 12 is substantially retained in its position within the dispensing section 20 during storage and transportation of the device 10.

Referring now to FIG. 2, an exemplary schematic diagram is shown, illustrating an exemplary alternate embodiment of the inventive apparatus 10 of FIG. 1, as an inventive apparatus 50 for storing, managing, and rapidly—dispensing energy cells 12. The most basic configuration of the apparatus 50 is essentially the same as that of apparatus 10 (of FIG. 1), in that it comprises a housing 54 (corresponding to the housing 14 of FIG. 1), having three main sections—a storage section 56 with an internal cell storage structure, a dispensing section 58 above, and a retention/feeding section 60, below, each substantially corresponding to sections 16, 20, and 18 of FIG. 1. The dispensing section 58, preferably comprises an opening 82 in the housing 54, positioned, sized, and configured to enable ejection of cells 12 therethrough in response to the user's dispensing action. Preferably, the user's dispensing action is enabled through at least one opening in an upper portion of the dispensing section 58, that enables the user to access and guide, preferably by a single finger (such as the user's thumb) a cell 12 that has been automatically positioned and readied for dispensing, through the opening 82. In one embodiment of the inventive apparatus 50, the cell access/guide opening comprises an elongated opening 84*a*, defined along the top edge surface of the dispensing section 58, sized, configured and positioned, to enable the user to guide the cell 12 readied for dispensing, through the opening 82 using their finger.

Optionally, the cell access/guide opening comprises an open corner region 84*b* that provides the user with a greater degree of access to, and control over, the readied cell 12. Alternately, the cell access/guide opening may comprise a combination of the open regions 84*a* and 84*b*. The specific size, position, and configuration of the open cell access/guide regions 84*a* and/or 84*b*, are preferably selected to advantageously balance the degree of dispensing guidance and control over the readied cell 12 made available to the user, with the degree to which the readied cell 12 is retained inside the dispensing region 58, and the resistance of the retained cell 12 to various forces capable of undesirably ejecting it from the apparatus 50 unintentionally and/or accidentally.

Moreover, the apparatus 50, preferably comprises additional advantageous components and elements that may include, but that are not limited to, at least one of the following:

A user-retractable retention/feeding component 62, positioned in the retention/feeding section 60, but extendable into the storage section 56, that is optionally releasably lockable in a retracted position (e.g., to facilitate loading of cells 12 into the storage section 56) by use of an optional lock/release control 64 operable by the user;

An optional exterior surface region 66, positioned on at least one of the outer surfaces of the housing 54, configured for providing thereon at least one of:
easily visible indicator(s) of the size of the cells 12, for which the apparatus 50 is intended,
decorative, promotional, and/or advertising elements,
a pocket and/or belt attachment, and
an optional visual indicator of the current number of cells 12 stored in the storage section 56, such as an elongated open slot 68, a series of openings 70*a* (and optionally 70*b*), aligned with predetermined positions of stored cells 12 (or optionally comprising high visibility indicators showing therethrough that are each only actuated when a cell is stored at a corresponding position within the storage region 56, or having portions of the region 66 being transparent or translucent, at least partially displaying the stored cells 12 therethrough. Optionally, any of the above indicators may additionally include displayed numeric information for each predetermined stored cell 12 position, that, at a glance, clearly indicates the actual number of stored cells 12 at that time;

Optionally, one or more additional features component 74, positioned along at least one outer surface of the housing 54 (shown and positioned, by way of example only, in a frontal region 72 of the housing 54). The features component 74 may comprise any component ranging from a structural component, such as a front grip component operable to increase the strength and/or the comfort of the user's grip of the housing 54, when the apparatus 50 is held by the user, to a set of electronic components providing additional optional features to the apparatus 50, such as one or more of the following:
A low-light energy cell 12 quantity and/or size assessment component (for example that illuminates (e.g., via LEDs)) elements 70*a*, 70*b* that correspond to the positions of stored cells 12,
a dispensing assistance light (such as a light 216 of FIGS. 4A-4B),
a component to enable manually or automatically activated rapid indication of each energy cell 12 remaining power capacity (for example, via a proportionally intense illumination of an indicator 70*b*), prior to its ejection by a user,
a component to enable manually or automatically activated indication of each stored cell 12 remaining power capacity (for example via a proportionally intense illumination of an indicators 70*a*, 70*b*), and/or
other electronic features (e.g., recharging, flashlight, radio, USB recharger, etc.); and/or Optionally, one or more supplemental features component(s) 78, positioned along at least one top or bottom outer surfaces of the housing 54 (shown and positioned, by way of example only, in a top region 76 of the housing 54). The supplemental features component 78 may comprise any of the features listed above, in connection with the optional component 74, but may alternately comprise an power interface operable to connect to an external connector 80, that may:
enable the cells 12 stored in the apparatus 50 to be recharged from an external power source,
provide power to an external device (not shown) from a predetermined number of cells 12 stored in the apparatus 50, and/or
provide one or more other power-interface related features to the apparatus 50.

Referring now to FIG. 3A-1, an exemplary cut-away side-view diagram is shown, illustrating a second exemplary embodiment of the inventive apparatus for storing, managing, and rapidly dispensing energy cells, shown as apparatus 100, comprising a housing 104, with an internal region 105 for storing cells 102*a* to 102*x*, a cell dispensing opening 106, a cell guidance opening 108, as well as a feeding/retention component 110, comprising by way of example, a platform 110*a*, sized and configured to feed and push forward a stack of cells 102*a* to 102*x* toward the upper portion of the housing 104 through the force, exerted into that direction, by a resilient force element 110*b* (such as a one or more springs, compressed gas piston, compressible rubber, coil, etc). Advantageously, the apparatus 100 also includes a cell retaining element 112, for example configured as ramp extending at least in part across the narrower cross-section of the housing 104, and positioned above the dispensing opening 106 and in front of the guidance opening 108, and further sized and configured, such that a readied for dispensing cell 102a is retained within the housing 104 during carrying and storage of the apparatus 100, even during undesired events, such as the apparatus 100 being dropped, but, at the same time being operable to guide the cell 102b though the opening 106 in response to the user's dispensing action through the opening 108, to facilitate the dispensing of the cell 102a by the user through the opening 106 an exemplary operation shown in FIG. 3B-1. p It should be noted, that the cell dispensing opening 106 of the apparatus 100, may be sized and shaped in a different manner from that shown in FIGS. 3A-1 and 3B-1, to better facilitate the loading and dispensing of stored energy cells 102a to 102x, as a matter of design choice, without departing from the spirit of the present invention. For example, the cell dispensing opening 106 may be circular in shape (for example, sized and configured to dispense cells 102a to 102x having circular cross-sections).

Figures 1, 3B:
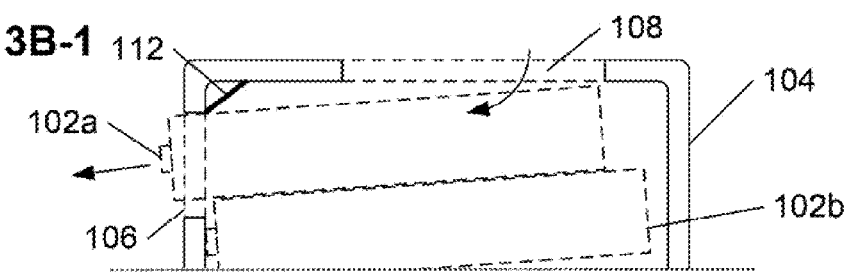

It should also be noted, that the cell guidance opening 108 of the apparatus 100, may be sized and shaped in a different manner from that shown in FIGS. 3A-1 and 3B-1, to better facilitate the loading and dispensing of stored energy cells 102a to 102x, as a matter of design choice, without departing from the spirit of the present invention. For example, referring now to FIGS. 3A-2 and 3B-2, an alternate embodiment of the apparatus 100 of FIG. 3A-1 is shown as an apparatus 100', comprising a cell guidance opening 108' that is significantly larger, and differently shaped, from the cell guidance opening 108 of FIG. 3A-1. While the expanded opening 108' provides some exposure of the "next-to-be-dispensed" cell 102a during storage thereof, as is illustrated in FIG. 3B-2, the size and shape of the opening 108' further facilitates more comfortable and rapid dispensing of cells 102a to 102x from the apparatus 100'. Similarly, the expanded opening 108' provides for more comfortable and rapid loading of cells 102a to 102x into the apparatus 100'. Each of the cells 102a to 102x has an axis of elongation "A" as shown in FIG. 3A-2.

Figure 12A:
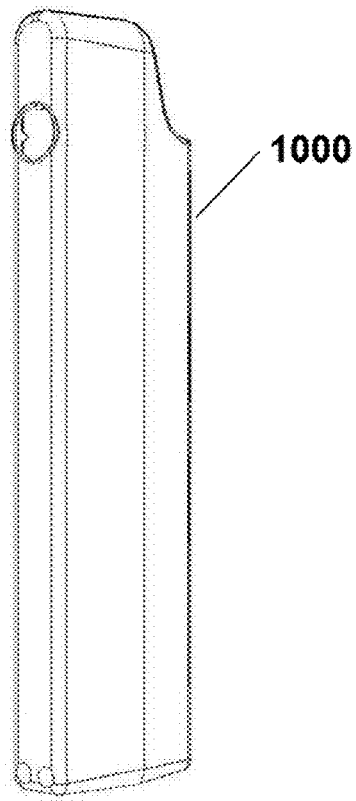
FIGS. 12A-12C are exemplary diagrams, in various views, of an exemplary product implementation of the inventive apparatus of FIGS. 3A-2 and 3B-2.
Figure 12B:
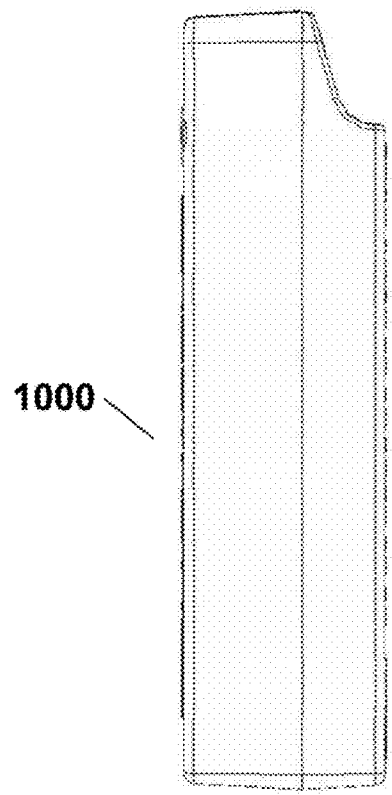
Figure 12C:
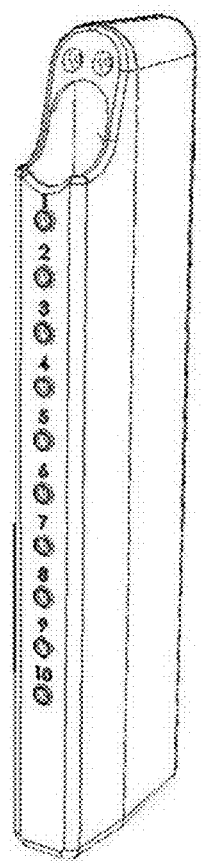

Referring now to FIGS. 12A-12C, exemplary diagrams, in various views, are shown, illustrating an exemplary product implementation of the inventive apparatus 100' of FIGS. 3A-2 and 3B-2, as an apparatus 1000, having a cell dispensing opening with a circular cross-section, and that, by way of example, further incorporates the optional visual indicators of the current number of cells stored therein, such as the indicators 70a, 70b of apparatus 40 of FIG. 2, that also indicate the maximum cell storage capacity thereof.

Referring now to FIG. 3C, an exemplary cut-away front-view diagram is shown, illustrating the inventive apparatus 100 of FIG. 3A-1, by way of example, during utilization thereof to store energy cells 102a to 102x, while FIG. 3D shows an exemplary front-view diagram illustrating the inventive apparatus 100 of FIG. 3A-1, supplied with an optional improved grip/traction element 114 (such as shaped/textured, and/or rubberized grip positioned on at least the outer front surface of the housing 104), to improve the grip of the user during utilization of the apparatus 100 during dispensing of the cells therefrom.

Referring now to FIGS. 4A and 4B, exemplary cut-away and full front-view diagrams, respectively, are shown, illustrating a second alternate embodiment of the inventive apparatus 100 of FIG. 3A-1, as an apparatus 200 having components and elements 204 to 214, generally corresponding to components and elements 104 to 114 of FIGS. 3A-1, 3B-1 (except that element 212a corresponds to element 112 of FIG. 3A-1), but that stores cells 202a to 202x in a staggered stack, enabling the housing 204 to be of a shorter height than would otherwise be necessary, and increasing the transverse thickness thereof. The apparatus 204 further comprises a transverse cell alignment element 212a that ensures that the cell 202a, readied for dispensing is properly aligned with the dispensing opening 206, the cell retaining element 212b, and the guidance opening 208. As a result, the cell alignment element 212a provides sufficient space at the upper portion of the housing 204 to house one or more useful electronic components, for example, as described above in connection with FIG. 2. By way of example, one such component may be a dispensing guidance light 216 positioned proximal to the dispensing opening 206 to assist the user in dispensing cells from the apparatus 200 during dark or low-light conditions.

Referring now to FIGS. 5A and 5B, exemplary cut-away and full front-view diagrams illustrating a first alternate embodiment of the inventive apparatus 100' of FIG. 3A-2, is shown, by way of example only, as an apparatus 300. The apparatus 300 is configured for storing 9 Volt energy cells 302a to 302x, and includes various components and elements, 304, and 310a-312, that essentially correspond to, and are equivalents of, elements 104 to 106 and 110a-112, of the apparatus 100' of FIG. 3A-2. The cell dispensing opening 306 and cell guidance opening 308 of the apparatus 300, also correspond to the cell dispensing opening 106, and cell guidance opening 108' of the apparatus 100' of FIG. 3A-2, except that the cell dispensing and guidance openings 306, and 308, respectively, are sized and configured to dispense and facilitate guidance of cells 302a to 302x, which have a different size and cross-section from cells 102a to 102x of FIG. 3A-2.

It should also be noted, that in practice, the various embodiments of the apparatus of the present invention (and especially the housing component thereof) can be fabricated using a wide variety of different manufacturing techniques, without departing from the spirit of the invention. For example, referring now, to apparatus 300 of FIGS. 5A to 5B, the housing 304 may be fabricated by attaching two sections to one another—a frontal section 304a, comprising the cell dispensing opening 306, and a rear section 304b, comprising the cell guidance opening 308. The sections 304a and 304b may be attached to one another using one or more techniques, that include, but that are not limited to, at least one of the following: snap-fit, fusing, adhesive, and/or assembly utilizing screws with matching posts having longitudinal screw-receiving channels therein.

Figure 13A:
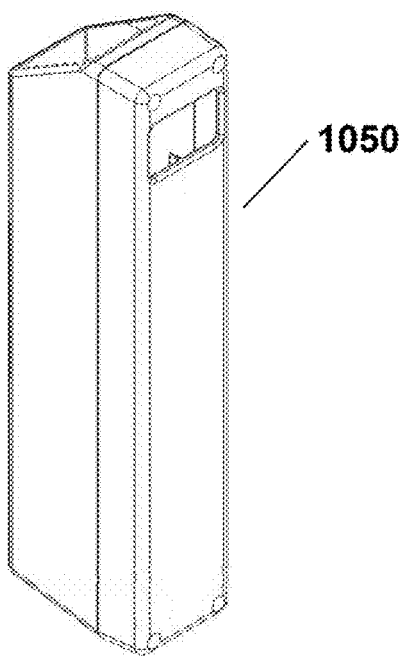
FIGS. 13A-13C are exemplary diagrams, in various views, of an exemplary product implementation of the inventive apparatus of FIGS. 5A and 5B.
Figure 13B:
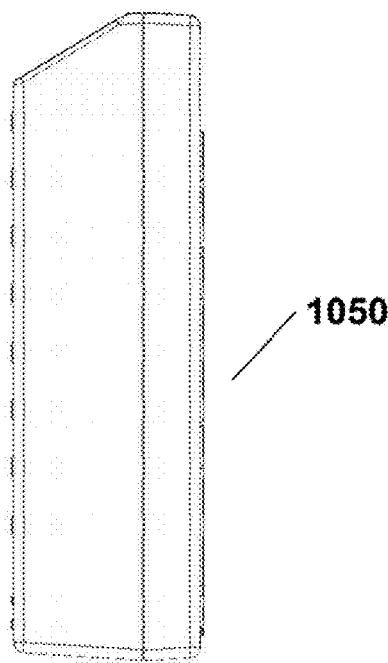
Figure 13C:
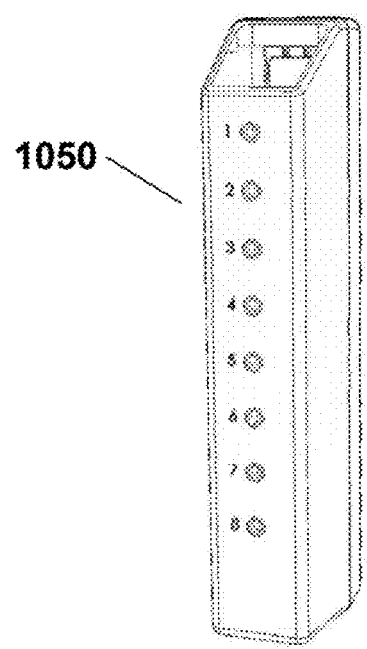

Referring now to FIGS. 13A-13C, exemplary diagrams, in various views, are shown, illustrating an exemplary product implementation of the inventive apparatus 300 of FIGS. 5A and 5B, as an apparatus 1050 configured for storing 9 Volt energy cells, that, by way of example, further incorporates the optional visual indicators of the current number of cells stored therein, such as the indicators 70a, 70b of apparatus 40 of FIG. 2, that also indicate the maximum cell storage capacity thereof. The apparatus 1050 further illustrates, by way of example, a two-part "front and back" housing construction configuration, shown in FIG. 5B, above, as housing 304, that comprises housing sections 304a and 304b.

Referring now to FIG. 6, an exemplary cut-away front-view diagram illustrating a second alternate embodiment of the inventive apparatus 100' of FIG. 3A-2, is shown, by way of example only, as apparatus 400. The apparatus 400 is configured for storing energy cells 402a to 402x that are larger (i.e. that have larger diameter) than cells 102a to 102x of FIG. 3A-2, but includes various components and elements, 404, and 410a-412, that essentially correspond to, and are equivalents of, elements 104 to 106 and 110a-112, of the apparatus 100' of FIG. 3A-2. The cell dispensing opening 406 and cell guidance opening 408 of the apparatus 400, also correspond to the cell dispensing opening 106, and cell guidance opening 108' of the apparatus 100' of FIG. 3A-2, except that the cell dispensing and guidance openings 406, and 408, respectively, are sized and configured to dispense and facilitate guidance of cells 402a to 402x, which have a different (e.g., a larger) size (i.e., cross-sectional diameter) than cells 102a to 102x of FIG. 3A-2.

Referring now to FIG. 7, an exemplary cut-away side-view diagram is shown, illustrating a third exemplary embodiment of the inventive apparatus for storing, managing, and rapidly dispensing energy cells, as an apparatus 500, that is substantially similar to the apparatus 100 of FIG. 3A-1 (and having components and elements 504 to 508, corresponding to components 104 to 108 of FIG. 3A-1), but that comprises a novel feeding/retaining component 510 having an advantageous cell loading assistance feature. While the component 510 comprises a platform 510a and a force element 510b, corresponding to elements 110a and 110b of FIG. 3A-1, the platform 510a is preferably connected to a sliding track element 510c that guides a user-operable retraction element 510d, attached to the platform 510a via a connector 510e, along the length of the housing 504 toward the lowermost position 510g of the platform 510b, representing the most retracted position of the component 510, corresponding to the maximum capacity of the cell storage in the housing 504. Advantageously, to load the apparatus 500 with one or more fresh cells 502a, the user may utilize the retraction element 510d to retract the platform 510b to allow sufficient space to receive the one or more new cells 502a in the cell storage area of the housing 504. Optionally, the component 510 may be provided with a releasable locking element 510f, that may be selectively operated by the user to lock the retracted platform 510b in its lowermost position 510g, and/or alternately, that may be used to lock the platform 510b in one or more other partially retracted positions. The cells 502a to 502x may be fed into apparatus 500 one at a time by inserting them into the opening 506.

Referring now to FIG. 8, an exemplary partial cut-away side-view diagram is shown, illustrating a fourth exemplary embodiment of the inventive apparatus for storing, managing, and rapidly dispensing energy cells, shown by way of example, as an apparatus 600, comprising multiple cell loading assistance features. The apparatus 600 is substantially similar to the apparatus 500 of FIG. 7, in that it comprises a user-retractable and preferably user-lockable feeding/retaining component 610, corresponding to the component 510 of FIG. 7, and various elements thereof, except that rather than having to feed the new cells through its dispensing opening 606, the apparatus 600 comprises at least one openable, or removable side panel 612, exposing a substantial portion of the cell storage compartment 614 for rapid loading (or optionally removal) of multiple cells 602a therein. The panel 614 is shown to be one of the large side panels of the housing 604 by way of example, and may comprise both side large panels of the housing, or one of the narrow edge panels (not shown), or a combination of one of the edge panels and one of the large side panels, sized and configured to provide sufficient access to the cell storage compartment 614 for rapid loading therein, and/or removal therefrom of cells 602a. The side panel 612 may be hinged to swing open from the housing 604 (shown as configuration A), may completely removable from the housing 604 (shown as configuration B), or may slide to a predetermined open position, or completely slide off from the housing 604 (shown as configuration C).

Referring now to FIG. 9, an exemplary partial cut-away side-view diagram is shown, illustrating a fifth exemplary embodiment of the inventive apparatus for storing, managing, and rapidly dispensing energy cells, shown as an apparatus 700, comprising multiple cell loading assistance features. The apparatus 700 is similar at least in part to the apparatus 600 of FIG. 8, in that it comprises a user-retractable and preferably user-lockable feeding/retaining component 710, corresponding to the component 610 of FIG. 8, and various elements thereof, except that rather than having to open or remove one or two side/edge panels 612 to access the cell storage area 614 to place new cells therein, or to remove cells therefrom, the apparatus 700 comprises a sliding sleeve 712 that is operable to slide open to expose the cell storage interior portions of the housing 704, to a predetermined "open" position, or that may be completely removed from the apparatus 700 (and optionally replaced with a differently configured and/or embellished sleeve). The sleeve 712 may comprise an edge opening 712a for enabling the retraction element 710d to slide along the side of the housing 704, when the sleeve 712 is in a closed position. Preferably, the apparatus 700 also comprises a releasable sleeve locking component 714, operable to interface with and lock with a user-operable sleeve release element 712b, such that when the sleeve 712 is slid to its closed position, the release element locks with the locking component 714 to retain the sleeve 712 in its closed position during normal use of the apparatus 700, until the user releases it for opening by engaging the release element 712b. The housing 740 preferably comprises a lower portion 704b containing the main portion of the feeding/retention component 710, and the cell holding structure 704a, enclosed by the sleeve 712 during normal use, which may be a drawer-like structure with one open side, or which may have two open sides, or which may be a lattice-type infrastructure sufficient to support the loaded cell therein while the sleeve 712 is opened or removed.

Figure 10B:
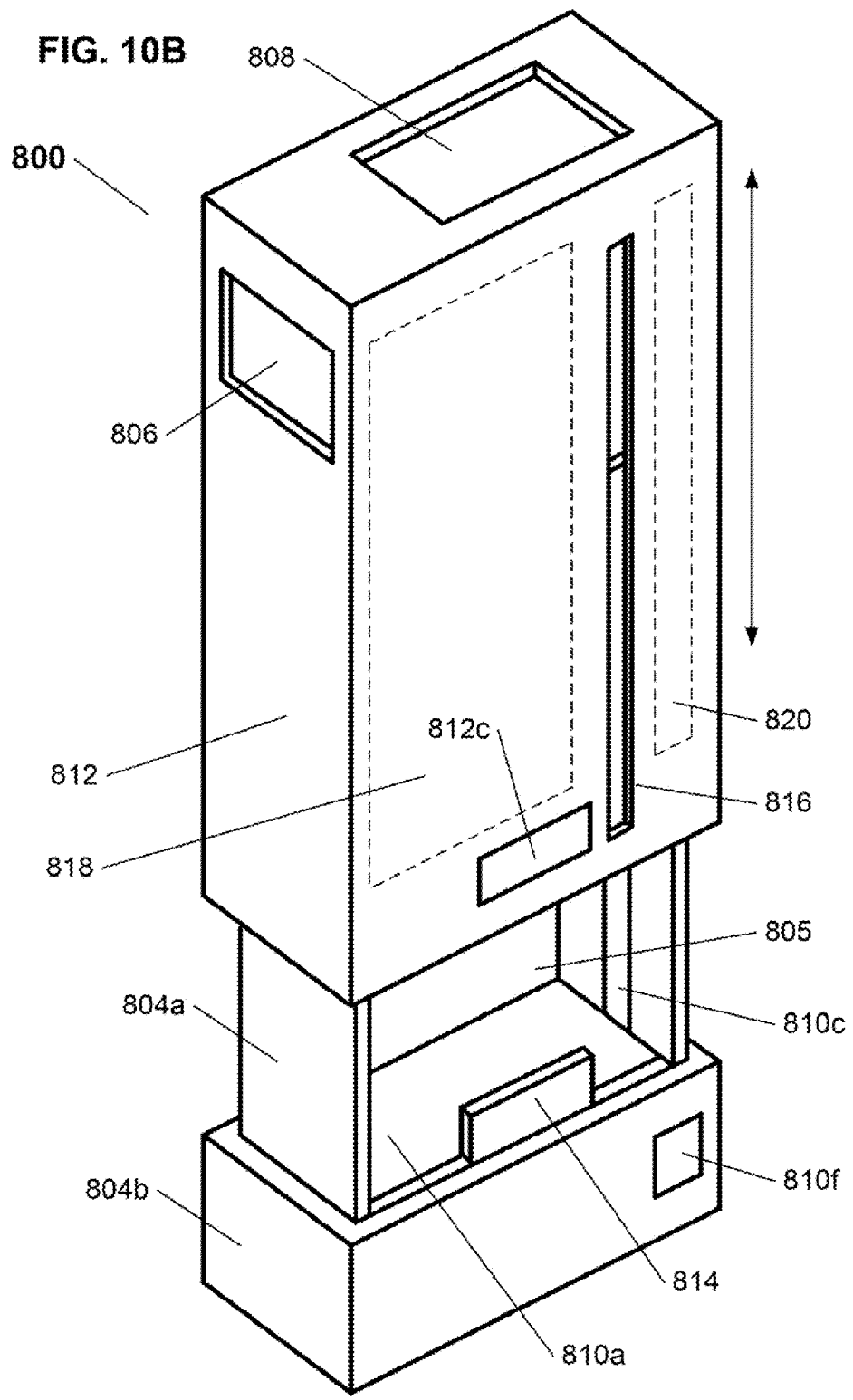

Referring now to FIGS. 10A and 10B, exemplary perspective view diagrams are shown, illustrating an exemplary alternate embodiment of the inventive apparatus 700 of FIG. 9, shown by way of example as an apparatus 800 shown in a closed position in FIG. 10A, and in a partially open position in FIG. 10B. The apparatus 800 is substantially similar to the apparatus 700 of FIG. 9, except that it may further comprise one or more additional elements 816, 818, and/or 820, substantially corresponding to elements 68, 66, and 70a, 70b of FIG. 2, respectively.

Referring now to FIG. 11, an exemplary partial cut-away side-view diagram is shown, illustrating a sixth exemplary embodiment of the inventive apparatus for storing, managing, and rapidly dispensing energy cells, shown as an apparatus 900, comprising multiple cell loading assistance features. The apparatus 900 is similar in configuration to the apparatus 700 of FIG. 9, except that the sleeve 912 is not removable from the apparatus 900, and slides toward the feeding/retaining component 910, as opposed to toward the cell dispensing area (as does the sleeve 712 of FIG. 9). Advantageously, the sleeve 912 is connected to the platform 910a via a connector 910d such that the force of the force element 910b normally keeps the sleeve 912 in a closed position, and such that when the sleeve 910 is operated by the user to move into an open position, such operation exposes the housing 904 internal cell storage region 904b, and simultaneously retracts the platform 910a, enabling easy loading and removal of cells 902*a* to 902*c*. Preferably, releasable locking element 910*f* of the component 910 is operable to releasably lock with element 910*g* of the sleeve 912, such that when the sleeve 912 is fully retracted, the elements 910*f* and 910*g* releasably interlock, causing the sleeve 912 to remain in its open position, while the platform 910*a* is fully retracted, allowing a maximum level of user access to the cell storage region 904*b*. By engaging the element 910*g*, the user is able to release the sleeve 912 from its locked open position and enable the action of the force element 910*b* to return the sleeve 912 to its closed position.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. An apparatus for storing and dispensing energy cells, each cell having a front with a top edge and a rear spaced from said front along an axis of elongation, said apparatus comprising:
    a housing having spaced front and rear walls, side walls interconnecting said front and rear walls and a top and a bottom to form an enclosure for containing energy cells with the cells positioned with the front of a cell facing the front wall and the rear of a cell facing the rear wall and an uppermost cell positioned adjacent the top of the housing when in an uppermost position;
    a dispensing opening in said front wall of a size to permit a single energy cell to be dispensed, said opening having a top portion positioned below the top edge of the front of an energy cell when the cell is positioned in the uppermost position in the housing ready for dispensing;
    a biased platform in said housing for urging the energy cells upward in the housing so the uppermost cell is in a discharge position with the top edge of the front of the energy cell positioned above the top portion of the dispensing opening; and
    a cut out portion formed by said rear wall, top and upper portion of said side wall of said housing so that an upper portion of the rear of the uppermost cell is exposed to enable a user to engage the rear of an energy cell to cause the energy cell to be dispensed through said dispensing opening.

2. The apparatus for storing and dispensing energy cells of claim 1 further including a ramp in said housing positioned above said dispensing opening and extending in from the top portion of the dispensing opening in the front wall to the top of the housing.

3. The apparatus for storing and dispensing energy cells of claim 1 wherein said housing has a series of openings to indicate the number of cells within the housing.

4. The apparatus for storing and dispensing energy cells of claim 3 wherein said openings are in said rear wall of said housing.

* * * * *